United States Patent
Poon et al.

(10) Patent No.: US 10,074,127 B2
(45) Date of Patent: *Sep. 11, 2018

(54) GENERATING A RECOMMENDATION

(71) Applicant: eBay Inc., San Jose, CA (US)

(72) Inventors: Alex Dai-Shun Poon, Los Altos Hills, CA (US); Reed Maltzman, San Francisco, CA (US); Jeffrey Taylor, Los Altos, CA (US)

(73) Assignee: eBay Inc., San Jose, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 14/885,298

(22) Filed: Oct. 16, 2015

(65) Prior Publication Data

US 2016/0042435 A1   Feb. 11, 2016

Related U.S. Application Data

(63) Continuation of application No. 13/565,661, filed on Aug. 2, 2012, now Pat. No. 9,165,300, which is a continuation of application No. 10/263,224, filed on Oct. 1, 2002, now Pat. No. 8,275,673.

(60) Provisional application No. 60/373,525, filed on Apr. 17, 2002.

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/00* (2013.01); *G06Q 30/02* (2013.01)

(58) Field of Classification Search
CPC ............................ G06Q 30/0631; G06Q 30/02

USPC ...................................................... 705/26, 27
See application file for complete search history.

(56) References Cited

U.S. PATENT DOCUMENTS

| | | |
|---|---|---|
| 3,757,037 A | 9/1973 | Bialek |
| 4,992,940 A | 2/1991 | Dworkin |
| 4,996,642 A | 2/1991 | Hey |
| 5,310,997 A | 5/1994 | Roach et al. |
| 5,583,763 A | 12/1996 | Atcheson et al. |
| 5,749,081 A | 5/1998 | Whiteis |

(Continued)

FOREIGN PATENT DOCUMENTS

| | | |
|---|---|---|
| EP | 0957437 A2 | 11/1999 |
| WO | WO-0017792 A1 | 3/2000 |

(Continued)

OTHER PUBLICATIONS

Ansari et al., "Internet Recommendation Systems," Journal of Marketing Research, Aug. 2000, pp. 363-375, Proquest Dialog ID #235214891, 16pgs.*

(Continued)

*Primary Examiner* — Robert M Pond
(74) *Attorney, Agent, or Firm* — Shook, Hardy & Bacon L.L.P.

(57) ABSTRACT

A method and an apparatus for communicating a recommended item to a user are described. The method comprises determining that the user has a level of commitment to an item offered for sale, and, in response to this determination, communicating information concerning a recommended item to the user over a network. The recommended item is identified based on a set of longest words in a description of the item offered for sale.

20 Claims, 13 Drawing Sheets

| Item 710 | Number of viewings 720 | 735 |
|---|---|---|
| | | |

(56) References Cited

U.S. PATENT DOCUMENTS

| | | |
|---|---|---|
| 5,790,426 A | 8/1998 | Robinson |
| 5,790,790 A | 8/1998 | Smith et al. |
| 5,825,881 A | 10/1998 | Colvin, Sr. |
| 5,842,199 A | 11/1998 | Miller et al. |
| 5,845,265 A | 12/1998 | Woolston |
| 5,897,622 A | 4/1999 | Blinn et al. |
| 6,016,475 A | 1/2000 | Miller et al. |
| 6,041,311 A | 3/2000 | Chislenko et al. |
| 6,047,264 A | 4/2000 | Fisher et al. |
| 6,049,777 A | 4/2000 | Sheena et al. |
| 6,055,513 A | 4/2000 | Katz et al. |
| 6,061,448 A | 5/2000 | Smith et al. |
| 6,064,980 A | 5/2000 | Jacobi et al. |
| 6,085,176 A | 7/2000 | Woolston |
| 6,085,229 A | 7/2000 | Newman et al. |
| 6,092,049 A | 7/2000 | Chislenko et al. |
| 6,101,484 A | 8/2000 | Halbert et al. |
| 6,101,486 A | 8/2000 | Roberts et al. |
| 6,108,493 A | 8/2000 | Miller et al. |
| 6,119,101 A | 9/2000 | Peckover |
| 6,119,137 A | 9/2000 | Smith et al. |
| 6,169,986 B1 | 1/2001 | Bowman et al. |
| 6,178,408 B1 | 1/2001 | Copple et al. |
| 6,192,407 B1 | 2/2001 | Smith et al. |
| 6,202,051 B1 | 3/2001 | Woolston |
| 6,202,063 B1 | 3/2001 | Benedikt et al. |
| 6,243,691 B1 | 6/2001 | Fisher et al. |
| 6,246,997 B1 | 6/2001 | Cybul et al. |
| 6,266,649 B1 | 7/2001 | Linden et al. |
| 6,289,342 B1 | 9/2001 | Lawrence et al. |
| 6,308,168 B1 | 10/2001 | Dovish et al. |
| 6,313,745 B1 | 11/2001 | Suzuki |
| 6,317,722 B1 | 11/2001 | Jacobi et al. |
| 6,321,221 B1 | 11/2001 | Bieganski |
| 6,334,127 B1 | 12/2001 | Bieganski et al. |
| 6,356,879 B2 | 3/2002 | Aggarwal et al. |
| 6,360,216 B1 | 3/2002 | Hennessey et al. |
| 6,370,513 B1 | 4/2002 | Kolawa et al. |
| 6,405,190 B1 | 6/2002 | Conklin |
| 6,412,012 B1 | 6/2002 | Bieganski et al. |
| 6,415,099 B1 | 7/2002 | Berger |
| 6,415,270 B1 | 7/2002 | Rackson et al. |
| 6,421,675 B1 | 7/2002 | Ryan et al. |
| 6,466,918 B1 | 10/2002 | Spiegel et al. |
| 6,484,149 B1 | 11/2002 | Jammes et al. |
| 6,487,539 B1 | 11/2002 | Aggarwal et al. |
| 6,499,029 B1 | 12/2002 | Kurapati et al. |
| 6,519,570 B1 | 2/2003 | Faber et al. |
| 6,519,571 B1 | 2/2003 | Guheen et al. |
| 6,519,750 B2 | 2/2003 | Yamashita |
| 6,587,838 B1 | 7/2003 | Esposito et al. |
| 6,615,247 B1 | 9/2003 | Murphy |
| 6,636,836 B1 | 10/2003 | Pyo |
| 6,643,640 B1 | 11/2003 | Getchius et al. |
| 6,738,780 B2 | 5/2004 | Lawrence et al. |
| 6,754,636 B1 | 6/2004 | Walker et al. |
| 6,772,150 B1 | 8/2004 | Whitman et al. |
| 6,785,671 B1 | 8/2004 | Bailey et al. |
| 6,801,909 B2 | 10/2004 | Delgado et al. |
| 6,813,775 B1 | 11/2004 | Finseth et al. |
| 6,826,559 B1 | 11/2004 | Ponte |
| 6,853,982 B2 * | 2/2005 | Smith ............... G06Q 30/02 705/26.7 |
| 6,865,546 B1 | 3/2005 | Song |
| 6,963,850 B1 | 11/2005 | Bezos et al. |
| 7,003,511 B1 | 2/2006 | Antonov |
| 7,016,863 B1 | 3/2006 | Kamakura et al. |
| 7,110,967 B1 | 9/2006 | Espenes et al. |
| 7,330,826 B1 | 2/2008 | Porat et al. |
| 7,613,633 B1 | 11/2009 | Woolston |
| 7,769,746 B2 | 8/2010 | Lu et al. |
| 7,831,476 B2 | 11/2010 | Foster et al. |
| 8,275,673 B1 | 9/2012 | Poon |
| 8,533,094 B1 | 9/2013 | Dorr |
| 8,606,811 B2 | 12/2013 | Johnson |
| 8,712,868 B2 | 4/2014 | Foster et al. |
| 2001/0021914 A1 | 9/2001 | Jacobi et al. |
| 2001/0021921 A1 | 9/2001 | Kan et al. |
| 2001/0034662 A1 | 10/2001 | Morris |
| 2001/0037255 A1 | 11/2001 | Tambay |
| 2001/0037259 A1 | 11/2001 | Sharma et al. |
| 2001/0044758 A1 | 11/2001 | Talib et al. |
| 2001/0054021 A1 | 12/2001 | Kawakura et al. |
| 2001/0056395 A1 | 12/2001 | Khan |
| 2002/0010625 A1 | 1/2002 | Smith et al. |
| 2002/0013734 A1 | 1/2002 | Bueno |
| 2002/0022994 A1 | 2/2002 | Miller et al. |
| 2002/0026386 A1 | 2/2002 | Walden |
| 2002/0052873 A1 | 5/2002 | Delgado et al. |
| 2002/0055890 A1 | 5/2002 | Foley |
| 2002/0059116 A1 | 5/2002 | Bulatovic et al. |
| 2002/0062258 A1 | 5/2002 | Bailey et al. |
| 2002/0062268 A1 | 5/2002 | Sato et al. |
| 2002/0065760 A1 | 5/2002 | Wiesehuegel et al. |
| 2002/0065877 A1 | 5/2002 | Kowtko et al. |
| 2002/0095404 A1 | 7/2002 | Davies et al. |
| 2002/0099629 A1 | 7/2002 | Sato et al. |
| 2002/0103692 A1 | 8/2002 | Rosenberg et al. |
| 2002/0138331 A1 | 9/2002 | Hosea et al. |
| 2002/0143660 A1 | 10/2002 | Himmel et al. |
| 2002/0147628 A1 | 10/2002 | Specter et al. |
| 2002/0156686 A1 | 10/2002 | Kraft et al. |
| 2002/0161664 A1 | 10/2002 | Shaya et al. |
| 2002/0174428 A1 | 11/2002 | Agnihotri et al. |
| 2002/0184116 A1 | 12/2002 | Tam et al. |
| 2002/0198882 A1 | 12/2002 | Linden et al. |
| 2003/0009411 A1 | 1/2003 | Ram et al. |
| 2003/0028427 A1 | 2/2003 | Dutta et al. |
| 2003/0037041 A1 | 2/2003 | Hertz |
| 2003/0037050 A1 | 2/2003 | Monteverde |
| 2003/0050863 A1 | 3/2003 | Radwin |
| 2003/0051240 A1 | 3/2003 | Schaffer et al. |
| 2003/0055831 A1 | 3/2003 | Ryan et al. |
| 2003/0061122 A1 | 3/2003 | Berkowitz et al. |
| 2003/0069740 A1 | 4/2003 | Zeidman |
| 2003/0084450 A1 | 5/2003 | Thurston et al. |
| 2003/0093331 A1 | 5/2003 | Childs et al. |
| 2003/0093793 A1 | 5/2003 | Gutta |
| 2003/0105682 A1 | 6/2003 | Dicker et al. |
| 2003/0110056 A1 | 6/2003 | Berghofer et al. |
| 2003/0131070 A1 | 7/2003 | Stroebel et al. |
| 2003/0145326 A1 | 7/2003 | Gutta et al. |
| 2003/0182196 A1 | 9/2003 | Huang |
| 2003/0182249 A1 | 9/2003 | Buczak |
| 2003/0208399 A1 | 11/2003 | Basak et al. |
| 2003/0217332 A1 | 11/2003 | Smith et al. |
| 2003/0233655 A1 | 12/2003 | Gutta et al. |
| 2004/0039657 A1 | 2/2004 | Behrens et al. |
| 2004/0078214 A1 | 4/2004 | Speiser et al. |
| 2004/0078297 A1 | 4/2004 | Veres et al. |
| 2004/0143450 A1 | 7/2004 | Vidali |
| 2004/0143584 A1 | 7/2004 | Chun et al. |
| 2004/0230499 A1 | 11/2004 | Stack |
| 2004/0260621 A1 | 12/2004 | Foster et al. |
| 2004/0267613 A1 | 12/2004 | Chan et al. |
| 2005/0028207 A1 | 2/2005 | Finseth et al. |
| 2005/0038717 A1 | 2/2005 | McQueen et al. |
| 2005/0038733 A1 | 2/2005 | Foster et al. |
| 2005/0055713 A1 | 3/2005 | Lee et al. |
| 2005/0125240 A9 | 6/2005 | Speiser et al. |
| 2005/0144086 A1 | 6/2005 | Speiser et al. |
| 2005/0234881 A1 | 10/2005 | Burago et al. |
| 2005/0234972 A1 | 10/2005 | Zeng et al. |
| 2005/0283488 A1 | 12/2005 | Colossi et al. |
| 2006/0026113 A1 | 2/2006 | Omoigui |
| 2006/0080315 A1 | 4/2006 | Mitchell |
| 2006/0230040 A1 | 10/2006 | Curtis et al. |
| 2006/0235843 A1 | 10/2006 | Musgrove et al. |
| 2007/0011154 A1 | 1/2007 | Musgrove et al. |
| 2008/0033776 A1 | 2/2008 | Marchese |
| 2008/0091463 A1 | 4/2008 | Shakamuri |
| 2010/0250341 A1 | 9/2010 | Hauser |
| 2010/0325011 A1 | 12/2010 | Foster et al. |
| 2011/0055040 A1 | 3/2011 | Foster et al. |

(56) References Cited

U.S. PATENT DOCUMENTS

| | | |
|---|---|---|
| 2012/0239679 A1 | 9/2012 | Gupta |
| 2012/0296764 A1 | 11/2012 | Poon et al. |
| 2014/0006203 A1 | 1/2014 | Dorr |
| 2014/0101183 A1 | 4/2014 | Johnson et al. |

FOREIGN PATENT DOCUMENTS

| | | |
|---|---|---|
| WO | WO-0017793 A1 | 3/2000 |
| WO | WO-0045319 A1 | 8/2000 |
| WO | WO-0116848 A2 | 3/2001 |
| WO | WO-0129726 A2 | 4/2001 |
| WO | WO-0131537 A2 | 5/2001 |
| WO | WO-0133401 A2 | 5/2001 |
| WO | WO-0231537 A2 | 5/2001 |
| WO | WO-0219203 A2 | 3/2002 |
| WO | WO-0229695 A1 | 4/2002 |
| WO | WO-0237926 A2 | 5/2002 |
| WO | WO-05003898 A2 | 1/2005 |
| WO | WO-05003898 A3 | 1/2005 |

OTHER PUBLICATIONS

"U.S. Appl. No. 09/769,546, Advisory Action dated Mar. 15, 2007", 3 pgs.

"U.S. Appl. No. 09/769,546, Advisory Action dated Mar. 19, 2008", 3 pgs.

"U.S. Appl. No. 09/769,546, Advisory Action dated Mar. 19, 2009", 3 pgs.

"U.S. Appl. No. 09/769,546, Decision on Appeal dated Feb. 21, 2012", 11 pgs.

"U.S. Appl. No. 09/769,546, Examiner's Answer to Appeal Brief dated Jul. 10, 2009", 13 pgs.

"U.S. Appl. No. 09/769,546, Final Office Action dated Jan. 9, 2009", 6 pgs.

"U.S. Appl. No. 09/769,546, Final Office Action dated Nov. 16, 2007", 6 pgs.

"U.S. Appl. No. 09/769,546, Final Office Action dated Dec. 1, 2006", 5 pgs.

"U.S. Appl. No. 09/769,546, Non Final Office Action dated Apr. 6, 2005", 8 pgs.

"U.S. Appl. No. 09/769,546, Non Final Office Action dated May 16, 2007", 8 pgs.

"U.S. Appl. No. 09/769,546, Non-Final Office Action dated Jun. 27, 2008", 5 pgs.

"U.S. Appl. No. 09/769,546, Notice of Allowance dated May 10, 2013", 7 pgs.

"U.S. Appl. No. 09/769,546, Reply Brief filed Sep. 10, 2009", 6 pgs.

"U.S. Appl. No. 09/769,546, Response filed Jan. 30, 2013 to Non Final Office Action dated Aug. 30, 2012", 12 pgs.

"U.S. Appl. No. 09/769,546, Response filed Feb. 7, 2008 to Final Office Action dated Nov. 16, 2007", 10 pgs.

"U.S. Appl. No. 09/769,546, Response filed Feb. 24, 2009 to Final Office Action dated Jan. 9, 2009", 10 pgs.

"U.S. Appl. No. 09/769,546, Response filed Mar. 1, 2007 to Final Office Action dated Dec. 1, 2006", 9 pgs.

"U.S. Appl. No. 09/769,546, Response filed Apr. 9, 2009 to Advisory Action dated Mar. 19, 2009", 21 pgs.

"U.S. Appl. No. 09/769,546, Response filed Apr. 20, 2012 to Final Office Action dated Jan. 9, 2009", 10 pgs.

"U.S. Appl. No. 09/769,546, Response filed Jun. 9, 2005 to Non Final Office Action dated Apr. 6, 2005", 11 pgs.

"U.S. Appl. No. 09/769,546, Response filed Aug. 15, 2007 to Non Final Office Action dated May 16, 2007", 9 pgs.

"U.S. Appl. No. 09/769,546, Response filed Sep. 29, 2008 to Non-Final Office Action dated Jun. 27, 2008", 14 pgs.

"U.S. Appl. No. 10/200,908, Advisory Action dated Aug. 27, 2004", 6 pgs.

"U.S. Appl. No. 10/200,908, Final Office Action dated Feb. 26, 2004", 13 pgs.

"U.S. Appl. No. 10/200,908, Non Final Office Action dated Oct. 8, 2003", 13 pgs.

"U.S. Appl. No. 10/200,908, Response filed Jan. 8, 2004 to Non Final Office Action dated Oct. 8, 2003", 20 pgs.

"U.S. Appl. No. 10/200,908, Response filed Jun. 24, 2004 to Final Office Action dated Feb. 26, 2004", 21 pgs.

"U.S. Appl. No. 10/263,224, Appeal Brief filed Sep. 19, 2007", 25 pgs.

"U.S. Appl. No. 10/263,224, Appeal Decision dated Aug. 24, 2011", 8 pgs.

"U.S. Appl. No. 10/263,224, Examiner Interview Summary dated May 23, 2012", 10 pgs.

"U.S. Appl. No. 10/263,224, Final Office Action dated Jun. 25, 2007", 9 pgs.

"U.S. Appl. No. 10/263,224, Final Office Action dated Aug. 1, 2005", 11 pgs.

"U.S. Appl. No. 10/263,224, Non Final Office Action dated Jan. 26, 2006", 12 pgs.

"U.S. Appl. No. 10/263,224, Non Final Office Action dated Feb. 28, 2012", 11 pgs.

"U.S. Appl. No. 10/263,224, Non Final Office Action dated Mar. 8, 2005", 19 pgs.

"U.S. Appl. No. 10/263,224, Non Final Office Action dated Jun. 19, 2006", 16 pgs.

"U.S. Appl. No. 10/263,224, Non Final Office Action daetd Dec. 13, 2006", 11 pgs.

"U.S. Appl. No. 10/263,224, Notice of Allowance dated May 23, 2012", 15 pgs.

"U.S. Appl. No. 10/263,224, Reply Brief filed Jan. 17, 2008", 5 pgs.

"U.S. Appl. No. 10/263,224, Response filed Mar. 9, 2006 to Non Final Office Action dated Jan. 26, 2006", 15 pgs.

"U.S. Appl. No. 10/263,224, Response filed Mar. 13, 2007 to Non Final Office Action dated Dec. 13, 2006", 13 pgs.

"U.S. Appl. No. 10/263,224, Response filed May 3, 2012 to Non Final Office Action dated Feb. 28, 2012", 14 pgs.

"U.S. Appl. No. 10/263,224, Response filed May 6, 2005 to Non Final Office Action dated Mar. 8, 2005", 14 pgs.

"U.S. Appl. No. 10/263,224, Response filed Sep. 18, 2006 to Non Final Office Action dated Jun. 19, 2006", 14 pgs.

"U.S. Appl. No. 10/263,224, Response filed Nov. 14, 2005 to Final Office Action dated Aug. 1, 2005", 15 pgs.

"U.S. Appl. No. 10/666,681, Advisory Action dated Jan. 11, 2013", 3 pgs.

"U.S. Appl. No. 10/666,681, Advisory Action dated Jul. 3, 2006", 2 pgs.

"U.S. Appl. No. 10/666,681, Advisory Action dated Oct. 7, 2009", 3 pgs.

"U.S. Appl. No. 10/666,681, Appeal Brief filed Jan. 22, 2010", 18 pgs.

"U.S. Appl. No. 10/666,681, Appeal Brief filed Jun. 25, 2007", 15 pgs.

"U.S. Appl. No. 10/666,681, Appeal Brief filed Dec. 4, 2009", 18 pgs.

"U.S. Appl. No. 10/666,681, Appeal Brief dated Oct. 18, 2006", 11 pgs.

"U.S. Appl. No. 10/666,681, Decision on Appeal Brief dated Sep. 3, 2010", 7 pgs.

"U.S. Appl. No. 10/666,681, Decision on Pre-Appeal Brief Request dated Mar. 18, 2013", 2 pgs.

"U.S. Appl. No. 10/666,681, Decision on Pre-Appeal Brief Request dated Aug. 16, 2006", 2 pgs.

"U.S. Appl. No. 10/666,681, Examiner's Answer to Appeal Brief dated Apr. 15, 2010", 9 pgs.

"U.S. Appl. No. 10/666,681, Final Office Action dated Jan. 13, 2014", 10 pgs.

"U.S. Appl. No. 10/666,681, Final Office Action dated Apr. 18, 2006", 9 pgs.

"U.S. Appl. No. 10/666,681, Final Office Action dated Jul. 15, 2009", 8 pgs.

"U.S. Appl. No. 10/666,681, Final Office Action dated Nov. 7, 2012", 10 pgs.

"U.S. Appl. No. 10/666,681, Non Final Office Action dated Apr. 17, 2012", 10 pgs.

(56) References Cited

OTHER PUBLICATIONS

"U.S. Appl. No. 10/666,681, Non Final Office Action dated Jun. 20, 2013", 10 pgs.
"U.S. Appl. No. 10/666,681, Non Final Office Action dated Jun. 20, 2014", 10 pgs.
"U.S. Appl. No. 10/666,681, Non Final Office Action dated Jul. 22, 2014", 11 pgs.
"U.S. Appl. No. 10/666,681, Non Final Office Action dated Nov. 16, 2005", 17 pgs.
"U.S. Appl. No. 10/666,681, Pre-Appeal Brief Request filed Jul. 18, 2006", 3 pgs.
"U.S. Appl. No. 10/666,681, Pre-Appeal Brief Request for Review dated Feb. 1, 2013", 5 pgs.
"U.S. Appl. No. 10/666,681, Pre-Appeal Brief Request dated Oct. 14, 2009", 5 pgs.
"U.S. Appl. No. 10/666,681, Response filed Jan. 30, 2006 to Non Final Office Action dated Nov. 16, 2005", 7 pgs.
"U.S. Appl. No. 10/666,681, Response filed Apr. 11, 2014 to Final Office Action dated Jan. 13, 2014", 11 pgs.
"U.S. Appl. No. 10/666,681, Response filed Jun. 19, 2006 to Final Office Action dated Apr. 18, 2006", 8 pgs.
"U.S. Appl. No. 10/666,681, Response filed Jul. 21, 2005 to Restriction Requirement dated Jun. 21, 2005", 9 pgs.
"U.S. Appl. No. 10/666,681, Response filed Sep. 15, 2009 to Final Office Action dated Jul. 15, 2009", 8 pgs.
"U.S. Appl. No. 10/666,681, Response filed Sep. 20, 2013 to Non Final Office Action dated Jun. 20, 2013", 12 pgs.
"U.S. Appl. No. 10/666,681, Response filed Dec. 27, 2012 to Final Office Action dated Nov. 7, 2012", 16 pgs.
"U.S. Appl. No. 10/666,681, Restriction Requirement dated Jun. 21, 2005", 6 pgs.
"U.S. Appl. No. 10/689,970, Appeal Brief filed Jun. 28, 2007", 26 pgs.
"U.S. Appl. No. 10/689,970, Examiner's Answer dated Oct. 2, 2007", 14 pgs.
"U.S. Appl. No. 10/689,970, Final Office Action dated Jan. 25, 2007", 18 pgs.
"U.S. Appl. No. 10/689,970, Non Final Office Action dated Jun. 13, 2006", 14 pgs.
"U.S. Appl. No. 10/689,970, Notice of Allowance dated Jan. 20, 2010", 9 pgs.
"U.S. Appl. No. 10/689,970, Notice of Allowance dated Jun. 29, 2010", 6 pgs.
"U.S. Appl. No. 10/689,970, Reply Brief filed Dec. 3, 2007", 10 pgs.
"U.S. Appl. No. 10/689,970, Response filed Oct. 13, 2006 to Non Final Office Action dated Jun. 13, 2006", 11 pgs.
"U.S. Appl. No. 10/689,970, Supplemental Notice of Allowability dated Jul. 26, 2010", 6 pgs.
"U.S. Appl. No. 10/877,806, Advisory Action dated Mar. 11, 2009", 3 pgs.
"U.S. Appl. No. 10/877,806, Advisory Action dated Sep. 28, 2010", 3 pgs.
"U.S. Appl. No. 10/877,806, Appeal Brief filed Jan. 13, 2011", 25 pgs.
"U.S. Appl. No. 10/877,806, Appeal Brief filed Dec. 7, 2010", 32 pgs.
"U.S. Appl. No. 10/877,806, Appeal Decision dated Jan. 15, 2014", 10 pgs.
"U.S. Appl. No. 10/877,806, Examiner Interview Summary dated Jul. 10, 2014", 3 pgs.
"U.S. Appl. No. 10/877,806, Examiner's Answer to Appeal Brief dated Apr. 4, 2011", 10 pgs.
"U.S. Appl. No. 10/877,806, Final Office Action dated Jul. 8, 2010", 9 pgs.
"U.S. Appl. No. 10/877,806, Final Office Action dated Dec. 18, 2008", 8 pgs.
"U.S. Appl. No. 10/877,806, Non Final Office Action dated Apr. 11, 2014", 9 pgs.
"U.S. Appl. No. 10/877,806, Non-Final Office Action dated Jan. 8, 2010", 9 pgs.
"U.S. Appl. No. 10/877,806, Non-Final Office Action dated Jun. 11, 2009", 8 pgs.
"U.S. Appl. No. 10/877,806, Non-Final Office Action dated Jun. 12, 2008", 14 pgs.
"U.S. Appl. No. 10/877,806, Preliminary Amendment filed May 6, 2005", 9 pgs.
"U.S. Appl. No. 10/877,806, Reply Brief filed Jun. 3, 2011", 6 pgs.
"U.S. Appl. No. 10/877,806, Response filed Feb. 17, 2009 to Final Office Action dated Dec. 18, 2008", 9 pgs.
"U.S. Appl. No. 10/877,806, Response filed Mar. 19, 2008 to Restriction Requirement dated Feb. 19, 2008", 7 pgs.
"U.S. Appl. No. 10/877,806, Response filed Apr. 8, 2010 to Non Final Office Action dated Jan. 8, 2010", 11 pgs.
"U.S. Appl. No. 10/877,806, Response filed Jul. 2, 2014 to Non Final Office Action dated Apr. 11, 2014", 11 pgs.
"U.S. Appl. No. 10/877,806, Response filed Sep. 7, 2010 to Final Office Action dated Jul. 8, 2010", 12 pgs.
"U.S. Appl. No. 10/877,806, Response filed Sep. 11, 2009 to Non Final Office Action dated Jun. 11, 2009", 9 pgs.
"U.S. Appl. No. 10/877,806, Response filed Sep. 12, 2008 to Non-Final Office Action dated Jun. 12, 2008", 10 pgs.
"U.S. Appl. No. 10/877,806, Restriction Requirement dated Feb. 19, 2008", 7 pgs.
"U.S. Appl. No. 10/944,070, Advisory Action dated Aug. 4, 2010", 4 pgs.
"U.S. Appl. No. 10/944,070, Appeal Brief filed Oct. 26, 2010", 42 pgs.
"U.S. Appl. No. 10/944,070, Appeal Decision dated Sep. 30, 2013", 12 pgs.
"U.S. Appl. No. 10/944,070, Examiner's Answer to Appeal Brief dated Jan. 24, 2011", 18 pgs.
"U.S. Appl. No. 10/944,070, Final Office Action dated Jan. 9, 2009", 18 pgs.
"U.S. Appl. No. 10/944,070, Final Office Action dated May 27, 2010", 18 pgs.
"U.S. Appl. No. 10/944,070, Non-Final Office Action dated Apr. 16, 2009", 31 pgs.
"U.S. Appl. No. 10/944,070, Non-Final Office Action dated Jul. 23, 2008", 16 pgs.
"U.S. Appl. No. 10/944,070, Non-Final Office Action dated Nov. 27, 2009", 19 pgs.
"U.S. Appl. No. 10/944,070, Preliminary Amendment filed Sep. 17, 2004", 17 pgs.
"U.S. Appl. No. 10/944,070, Response filed Mar. 1, 2010 to Non Final Office Action dated Nov. 27, 2009", 21 pgs.
"U.S. Appl. No. 10/944,070, Response filed Mar. 9, 2009 to Final Office Action dated Jan. 9, 2009", 28 pgs.
"U.S. Appl. No. 10/944,070, Response filed Jul. 16, 2009 to Non Final Office Action dated Apr. 16, 2009", 28 pgs.
"U.S. Appl. No. 10/944,070, Response filed Jul. 27, 2010 to Final Office Action dated May 27, 2010", 26 pgs.
"U.S. Appl. No. 10/944,070, Response filed Oct. 23, 2008 to Non-Final Office Action dated Jul. 23, 2008", 22 pgs.
"U.S. Appl. No. 12/870,022, Advisory Action dated Jan. 19, 2012", 3 pgs.
"U.S. Appl. No. 12/870,022, Advisory Action dated Sep. 26, 2011", 3 pgs.
"U.S. Appl. No. 12/870,022, Advisory Action dated Nov. 9, 2011", 4 pgs.
"U.S. Appl. No. 12/870,022, Appeal Brief filed Jan. 10, 2012", 23 pgs.
"U.S. Appl. No. 12/870,022, Decision on Pre-Appeal Brief dated Nov. 14, 2011", 2 pgs.
"U.S. Appl. No. 12/870,022, Final Office Action dated Jul. 28, 2011", 15 pgs.
"U.S. Appl. No. 12/870,022, Non Final Office Action dated Mar. 17, 2011", 13 pgs.
"U.S. Appl. No. 12/870,022, Pre-Appeal Brief Request filed Oct. 4, 2011", 5 pgs.
"U.S. Appl. No. 12/870,022, Response filed Jun. 3, 2011 to Non Final Office Action dated Mar. 17, 2011", 16 pgs.

(56) References Cited

OTHER PUBLICATIONS

"U.S. Appl. No. 12/870,022, Response filed Sep. 13, 2011 to Final Office Action dated Jul. 28, 2011", 13 pgs.
"U.S. Appl. No. 12/870,031, Final Office Action dated Apr. 25, 2013", 16 pgs.
"U.S. Appl. No. 12/870,031, Non Final Office Action dated Sep. 26, 2012", 15 pgs.
"U.S. Appl. No. 12/870,031, Notice of Allowance dated Dec. 6, 2013", 14 pgs.
"U.S. Appl. No. 12/870,031, Response filed Jul. 24, 2013 to Final Office Action Apr. 25, 2013", 15 pgs.
"U.S. Appl. No. 12/870,031, Response filed Dec. 26, 2012 to Non Final Office Action dated Sep. 26, 2012", 16 pgs.
"U.S. Appl. No. 13/247,798, Non Final Office Action dated Apr. 2, 2013", 8 pgs.
"U.S. Appl. No. 13/247,798, Notice of Allowance dated Aug. 5, 2013", 7 pgs.
"U.S. Appl. No. 13/247,798, Response filed Jul. 2, 2013 to Non Final Office Action dated Apr. 2, 2013", 10 pgs.
"U.S. Appl. No. 13/485,002, Advisory Action dated Jun. 12, 2015", 3 pgs.
"U.S. Appl. No. 13/485,002, Final Office Action dated Jan. 3, 2014", 34 pgs.
"U.S. Appl. No. 13/485,002, Final Office Action dated Jan. 16, 2015", 32 pgs.
"U.S. Appl. No. 13/485,002, Final Office Action dated Feb. 14, 2013", 32 pgs.
"U.S. Appl. No. 13/485,002, Final Office Action dated Sep. 14, 2012", 28 pgs.
"U.S. Appl. No. 13/485,002, Non Final Office Action dated May 23, 2014", 31 pgs.
"U.S. Appl. No. 13/485,002, Non Final Office Action dated Jun. 10, 2013", 31 pgs.
"U.S. Appl. No. 13/485,002, Notice of Allowance dated Jul. 6, 2015", 9 pgs.
"U.S. Appl. No. 13/485,002, Response filed Apr. 3, 2014 to Final Office Action dated Jan. 3, 2014", 11 pgs.
"U.S. Appl. No. 13/485,002, Response filed May 13, 2013 to Final Office Action dated Feb. 14, 2013", 12 pgs.
"U.S. Appl. No. 13/485,002, Response filed May 18, 2015 to Final Office Action dated Jan. 16, 2015", 14 pgs.
"U.S. Appl. No. 13/485,002, Response filed Sep. 10, 2013 to Non Final Office Action dated Jun. 10, 2013", 13 pgs.
"U.S. Appl. No. 13/485,002, Response filed Sep. 23, 2014 to Non Final Office Action dated May 23, 2014", 12 pgs.
"U.S. Appl. No. 13/485,002, Response filed Dec. 14, 2012 to Non Final Office Action dated Sep. 14, 2012", 10 pgs.
"U.S. Appl. No. 13/565,661, Final Office Action dated Feb. 24, 2015", 16 pgs.
"U.S. Appl. No. 13/565,661, Final Office Action dated Dec. 4, 2013", 16 pgs.
"U.S. Appl. No. 13/565,661, Non Final Office Action dated Jun. 4, 2013", 14 pgs.
"U.S. Appl. No. 13/565,661, Non Final Office Action dated Oct. 1, 2014", 27 pgs.
"U.S. Appl. No. 13/565,661, Non Final Office Action dated Dec. 5, 2012", 10 pgs.
"U.S. Appl. No. 13/565,661, Notice of Allowance dated Jun. 10, 2015", 15 pgs.
"U.S. Appl. No. 13/565,661, Response filed Mar. 4, 2014 to Final Office Action dated Dec. 4, 2013", 11 pgs.
"U.S. Appl. No. 13/565,661, Response filed Mar. 5, 2013 to Non Final Office Action dated Dec. 5, 12", 13 pgs.
"U.S. Appl. No. 13/565,661, Response filed May 26, 2015 to Final Office Action dated Feb. 24, 2015", 27 pgs.
"U.S. Appl. No. 13/565,661, Response filed Sep. 4, 2013 to Non Final Office Action dated Jun. 4, 2013", 10 pgs.
"U.S. Appl. No. 13/565,661, Response filed Dec. 31, 2014 to Non Final Office Action dated Oct. 1, 2014", 14 pgs.

"U.S. Appl. No. 14/022,003, Final Office Action dated Apr. 25, 2014", 13 pgs.
"U.S. Appl. No. 14/022,003, Non Final Office Action dated Oct. 7, 2013", 10 pgs.
"U.S. Appl. No. 14/022,003, Non Final Office Action dated Nov. 7, 2014", 9 pgs.
"U.S. Appl. No. 14/022,003, Response filed Jan. 7, 2014 to Non Final Office Action dated Oct. 7, 2013", 10 pgs.
"U.S. Appl. No. 14/022,003, Response filed Aug. 25, 2014 to Final Office Action dated Apr. 25, 2014", 9 pgs.
"U.S. Appl. No. 14/100,821, Non Final Office Action dated Feb. 25, 2015", 17 pgs.
"U.S. Appl. No. 14/100,821, Preliminary Amendment filed Mar. 3, 2014", 8 pgs.
"U.S. Appl. No. 14/100,821, Response filed Jun. 23, 2015 to Non Final Office Action dated Feb. 25, 2015", 7 pgs.
"Australian Application Serial No. 2013203878, Response filed Jun. 19, 2014 to Examiner's Report dated Mar. 7, 2014", 16 pgs.
"Australian Application Serial No. 2012200347, Examiner's Report dated Jul. 19, 2012", 3 pgs.
"Australian Application Serial No. 2012200347, Response filed Jan. 7, 2013 to Office Action dated Jul. 19, 2012", 2 pgs.
"Australian Application Serial No. 2013203878, First Examiner Report dated Mar. 7, 2014", 3 pgs.
"Australian Application Serial No. 2013203878, Notice of Final Rejection dated Jul. 4, 2014", 3 pgs.
"Chinese Application Serial No. 200680022268.9, Notice of Decision to Grant dated Nov. 30, 2012", with English translation, 5 pgs.
"Chinese Application Serial No. 200680022268.9, Response filed Nov. 11, 2009 to Office Action dated Jun. 26, 2009", with English translation of claims, 29 pgs.
"Computer Letter, Private Profiles—NexTag—Of all the auction sites on the Web, here's one an economist might like", vol. 15, No. 28, [Online]. Retrieved from the Internet: <URL: http://www.nextag.com/serv/main/about/computer/letter.html>, (Aug. 23, 1999), 3 pgs.
"eBizAutos: It All About the Cars", [Online]. Retrieved from the Internet: <URL: http://www.ebizautos.com/>, (Accessed Apr. 15, 2005), 2 pgs.
"European Application Serial No. 06773535.7, Office Action dated May 13, 2011", 2 pgs.
"European Application Serial No. 06773535.7, Response filed Mar. 1, 2012 to Office Action dated May 13, 2011", 22 pgs.
"European Application Serial No. 06773535.7, Examination Notification Art. 94(3) dated Feb. 5, 2014", 3 pgs.
"European Application Serial No. 06773535.7, Response filed Jun. 4, 2014", 17 pgs.
"European Application Serial No. 13167535.7, Extended European Search Report dated Jan. 24, 2014", 5 pgs.
"European Application Serial No. 13167535.7, Office Action dated Mar. 3, 2014", 2 pgs.
"European Application Serial No. 13167535.7, Response filed Jul. 30, 2014", 51 pgs.
"Indian Application Serial No. 9703/DELNP/2007, First Examination Report dated Feb. 22, 2013", 4 pgs.
"Indian Application Serial No. 9703/DELNP/2007, Response filed Sep. 3, 2013", 23 pgs.
"International Application Serial No. PCT/US03/33294, International Preliminary Report on Patentability dated Jan. 30, 2006", 4 pgs.
"International Application Serial No. PCT/US03/33294, International Search Report dated Jun. 14, 2005", 8 pgs.
"International Application Serial No. PCT/US03/33294, Written Opinion dated Sep. 8, 2005", 4 pgs.
"International Application Serial No. PCT/US2004/020075, International Preliminary Report on Patentability dated Jan. 3, 2006", 4 pgs.
"International Application Serial No. PCT/US2004/020075, Written Opinion dated Aug. 31, 2005", 3 pgs.
"International Application Serial No. PCT/US2006/23807, Written Opinion dated Feb. 28, 2007", 3 pgs.

(56) References Cited

OTHER PUBLICATIONS

"Query—Definition by Dictionary.com", [Online]. Retrieved from the Internet: <http://dictionary.reference.com/browse/query>, (Accessed 2011), 3 pgs.

"WebSphere Commerce Professional Edition", [Online]. Retrieved from the Internet: <URL: http://www-306.ibm.com/software/genservers/commerce/wcpe/>, (Accessed Apr. 21, 2005), 4 pgs.

Andale Gallery, "Andale", www.andale.com/corp/products/gallery.jsp, (Printed May 21, 2002), 2 pgs.

Andale Gallery, "Gallery—Cross Sell More Items", Copyright © 1999-2005 Andale Inc., [Online]. Retrieved from the Internet: <URL: http://cms.andale.com/corp/products/gallery.jsp (also http://cms.andale.com/auction/gallery.html)> Accessed on Web Apr. 15, 2005, (Accessed Apr. 15, 2005), 5 pgs.

Andale Gallery, "Prominently Featured on Your Listings", Copyright © 2001 Andale, Inc., [Online]. Retrieved from the Internet: <URL: http://www.andale.com/corp/tour/gal_tour4.html> Accessed on Web—Apr. 15, 2005, (Accessed Apr. 15, 2005), 1 pg.

Ansari, A., "Internet Recommendation System", Journal of Marketing Research, vol. 37(3), Proquest #57914570, (Aug. 2000), 13 pgs.

Ardissono, Liliana, et al., "Tailoring the Interaction With Users in Electronic Shops", Proceedings of the Seventh International Conference on User Modeling, Banff, Canada, (1999), 35-44.

Balabanovic, Marko, "An Adaptive Web Page Recommendation Service", Stanford University Digital Libraries Project Working Paper, Proceedings of the First International Conference on Autonomous Agents, (1999), 378-385.

Breese, John S, et al., "Empirical Analysis of Predictive Algorithms for Collaborative Filtering", Technical Report MSR-TR-98-12—Microsoft Research, (May 1998—Revised Oct. 1998), 1-21.

Burke, Robin, "The Wasabi Personal Shopper: a case-based recommender system", Proceedings of the Sixteenth National Conference on Artificial Intelligence and the Eleventh Innovative Applications of Artificial Intelligence Conference Innovative Applications of Artificial Intelligence, (1999), 844-849.

Changchien, S, "Mining association rules procedure to support online recommendation by customers and product fragmentation", Expert Systems with Application, 20(4), (May 2001), 325-335.

Cheung, N., "Buy this! [e-commerce recommendation software]", Information Age, (Feb. 2001), 33-4.

Cheung, W., "Mining customer preference ratings for product recommendation using the support vector machine and the latent class model", Proceedings of the 2nd International Conference on Data Mining Methods and Databases for Engineering, Finance and Other Fields, Cambridge, UK, (Jul. 2000), 601-10.

Chien, Yi-Ying, "A personalized Internet shopping agent", Proceedings of the International Conference on Parallel and Distributed Processing Techniques and Applications. PDPTA'2000, pt. 4, (2000), 1849-55.

Chun, In-Gook, et al., "The implementation of knowledge-based recommender system for electronic commerce using Java expert system library", International Symposium on Industrial Electronics, 2001. Proceedings. ISIE 2001, vol. 3, (Jun. 12-16, 2001), 1766-1770.

Claypool, Mark, et al., "Inferring User Interest (Aug. 2001)", Computer Science Technical Report Series, (Aug. 31, 2001), 1-17.

Cotlier, Moira, "The Electronic Catalog: Upsetting Online Can Raise Top Line", Catalog Age, 18(7), (Jun. 1, 2001), 93.

Demiriz, Ayhan, "Enhancing Product Recommender Systems on Sparse Binary Data", E-Buisiness Department, Verizon, Inc., (2002), 1-17.

Ebizautos, "Better Presentations. Better Results on eBay Motors.", eBizAutos—eBay Motors Auction Management System for Auto & Motorcysle Dealers, www.ebizautos.com, (Printed May 21, 2002), 1 page.

Flynn, B., "Next Hot Web Play? Precision Targeting", Brandweek, 42(i8), Proquest #68864267., (Feb. 19, 2001), 21(3pgs).

Greco, Carl, "What you should know before joining an Internet Mall", Direct Marketing, 61(10), (Feb. 1999), 42-3.

Harvey, L, ""On Birthdays" mortgages, ice cream sundaes, and term life. How personalization and cross selling tools provide cross-selling in the enterprise", E-business Strategies & Solutions, (Jul. 1999), 31-5.

Hirooka, Y, et al., "Recommending books of revealed and latent interests in e-commerce", Industrial Electronics Society, 2000. IECON 2000. 26th Annual Conference of the IEEE, vol. 3, (2000), 1632-1637.

Hirooka, Yasuo, et al., "Extending Content-Based Recommendation by Order-Matching and Cross-Matching Methods", Lecture Notes in Computer Science; vol. 1875, Proceedings of the First International Conference on Electronic Commerce and Web Technologies, (2000), 177-190.

Hong, Se June, et al., "A New Approach for Item Choice Recommendations", Proceedings of the Third International Conference on Data Warehousing and Knowledge Discovery, (2001), 131-140.

Iacobucci, Dawn, "Recommendation Agents on the Internet", Journal of Interactive Marketing, 14(3), (2000), 2-11.

IBM, "WebSphere Commerce Professional Edition", Features at Glance, www-3.ibm.com/software/webservers/commerce/wc_pe/morefeatures.html, (Printed May 21, 2002), 1 page.

Kanemoto, H, "Web Customer Action Analysis System", Matsushita Technical Journal, 48(1), (Feb. 2002), 26-29.

Karypis, George, "Evaluation of Item-Based Top-N Recommendation Algorithms", Technical Report #00-046, http://www-users.cs.umn.edu/~karypis/publications/Papers/PDF/itemrs.pdf, (2000), 1-13.

Kitts, Brendan, et al., "Cross-sell: A Fast Promotion-Tunable Customer-item Recommendation Method Based on Conditionally Independent Probabilities", Proceedings of the sixth ACM SIGKDD international conference on Knowledge discovery and data mining, Boston, MA USA, (Aug. 2000), 437-446.

Kohrs, Arnd, et al., "Using category-based collaborative filtering in the Active WebMuseum", 2000 IEEE International Conference on Multimedia and Expo, 2000. ICME 2000, vol. 1, (Jul.30-Aug. 2, 2000), 351-354.

Kumar, Ravi, "Recommendation Systems: A Probabilistic Analysis", Journal of Computer and System Sciences, 63(1), (Aug. 2001), 42-61.

Kwak, Mary, "Web Sites Learn to Make Smarter Suggestions", MIT Sloan Management Review, 42(4), (Summer 2001), 17.

Kwak, Mira, "Collaborative filtering with automatic rating for recommendation", IEEE International Symposium on Industrial Electronics, 2001. Proceedings. ISIE 2001, vol. 1, (Jun. 12-16, 2001), 625-628.

Kyeonah, Yu, "Improving the performance of collaborative recommendation by using multi-level similarity computation", Artificial Intelligence and Soft Computing : Proceedings of the IASTED International Conference,,(Jul. 24-26, 2000), 241-5.

Lee, Wee Sun, "Collaborative Learning for Recommender Systems", Proceedings of the Eighteenth International Conference on Machine Learning, (2001), 314-321.

Lin, Weiyang, et al., "Efficient Adaptive-Support Association Rule Mining for Recommender Systems", Data Mining and Knowledge Discovery, 6(1), (2001), 83-105.

Linden, G., et al., "Amazon.com recommendations: item-to-item collaborative filtering", IEEE Internet Computing, 7(1), (Jan.-Feb. 2003), 76-80.

Loney, Fred N, "Faceted Preference Matching in Recommender Systems", Proceedings of the Second International Conference on Electronic Commerce and Web Technologies, (2001), 295-304.

Maes, Pattie, et al., "Agents that Buy and Sell", Communications of the ACM 42(3), (Mar. 1999), 81-91.

Maes, Pattie, et al., "Agents that Buy and Sell:", Transforming Commerce as we Know it, 1998 MIT Media Laboratory. Submitted to the Communications of the ACM, Mar. 1999 Issue, (1998), 12 pgs.

Mcallister, Neil, "Getting Personal", New Architect, (Nov. 2001), 1-8.

Mcdonald, D W, "Expertise recommender: a flexible recommendation system and architecture", Proceedings of the 2000 ACM conference on Computer supported cooperative work, (2000), 231-240.

(56) References Cited

OTHER PUBLICATIONS

Pedersen, P., "Behavioral Effects of Using Software Agents for Product and Merchant Brokering: An Experimental Study of Consumer Decision-Making", International Journal of Electronic Commerce, 5(1), (Fall 2000), 125-141.

Pennock, David M, et al., "Social Choice Theory and Recommender Systems: Analysis of the Axiomatic Foundations of Collaborative Filtering", Proceedings of the Seventeenth National Conference on Artificial Intelligence and Twelfth Conference on Innovative Applications of Artificial Intelligence, (2000), 729-734.

Ramakrishnan, N, et al., "Privacy risks in recommender systems", IEEE Internet Computing, 5(6), (Nov.-Dec. 2001), 54-63.

Roe, Andy, "Amazon Adds Seller Services", [Online]. Retrieved from the Internet: <URL: http://web.archive.org/web/20000816024400/http://www.auctionwatch.com/awdaily/dailynews/august99/3-081899.html>, (Aug. 18, 1999), 2 pgs.

Sarwar, B., et al., "Analysis of recommendation algorithms for e-commerce", Proceedings of the 2nd ACM conference on EC, (2000), 158-167.

Sarwar, Badrul, et al., "Item-based Collaborative Filtering Recommendation Algorithms", WWW '01 Proceedings of the 10th international conference on World Wide Web, (May 1-5, 2001), 285-295.

Schafer, J, et al., "E-commerce recommendation applications", Data Mining and Knowledge Discovery, 5(1-2), (2001), 115-153.

Schafer, J., et al., "E-Commerce Recommendation Applications", GroupLens Research Project, Dept. of Computer Science & Engineering, University of Minnesota, Minneapolis, (2001), 1-24.

Schafer, J. Ben, et al., "Recommender Systems in E-Commerce", Department of Science and Engineering—University of Michigan, (2001), 1-9.

Schien, Andrew I, et al., "Methods and Metrics for Cold-Start Recommendations", Proceedings of the 25th Annual International ACM SIGIR Conference on Research and Development in Information Retrieval (SIGIR 2002), (2002), 1-9.

Schubert, Petra, "Virtual Communities of Transaction:The Role of Personalization in Electronic Commerce", Electronic Markets Journal, 10(1), (2000), 1-13.

Seitz, Juergen, et al., "Impacts of Software Agents in E-Commerce Systems on Customer?s Loyalty and on Behavior of Potential Customers", Chapter 13 from Strategies for eCommerce Success: by Bijan Fazlollahi, IRM Press, (2000), 9 pgs.

Towle, Brendon, et al., "Knowledge Based Recommender Systems Using Explicit User Models", Knowledge Based Electronic Markets, (2000), 74-77.

Tran, T., "Hybrid Recommender Systems for Electronic Commerce", Proceedings of the Seventeenth National Conference on Artificial Intelligence (AAAI-00) Workshop on Knowledge-Based Electronic Markets, (2000), 78-84.

Wilder, C, et al., "E-Commerce Emerges", Information Week, No. 584, (Jun. 17, 1996), 14-15.

"U.S. Appl. No. 12/870,022, Notice of Non-Compliant Amendment dated May 24, 2016", 4 pgs.

"U.S. Appl. No. 12/870,022, Response Filed Jul. 18, 2016 to Notice of Non-Compliant Amendment dated May 24, 2016", 19 pgs.

"U.S. Appl. No. 12/870,022. Response filed Jan. 14, 2016 to Non Final Office Action dated Aug. 14, 2015", 18 pgs.

"U.S. Appl. No. 14/022,003, Appeal Brief filed Jun. 27, 2016", 30 pgs.

"U.S. Appl. No. 14/022,003, Decision on Pre-Appeal Brief Request dated May 11, 2016", 2 pgs.

"U.S. Appl. No. 14/022,003, Non Final Office Action dated Jan. 22, 2016", 11 pgs.

"U.S. Appl. No. 14/022,003, Pre-Appeal Brief Request filed Apr. 25, 2016", 5 pgs.

U.S. Appl. No. 10/263,224 U.S. Pat. No. 8,275,673, filed Oct. 1, 2002, Method and System to Recommend Further Items to a User of a Network-Based Transaction Facility Upon Unsuccessful Transacting with Respect to an Item.

U.S. Appl. No. 13/565,661 U.S. Pat. No. 9,165,300, filed Aug. 2, 2012, Generating a Recommendation.

U.S. Appl. No. 10/200,908, filed Jul. 22, 2002, Seller Configurable Merchandising in an Electronic Marketplace.

U.S. Appl. No. 10/689,970 U.S. Pat. No. 7,831,476, filed Oct. 20, 2003, Listing Recommendation in a Network-Based Commerce System.

U.S. Appl. No. 12/870,022, filed Aug. 27, 2010, Listing Recommendation in a Network-Based System.

U.S. Appl. No. 10/666,681, filed Sep. 18, 2003, Product Recommendation in a Network-Based Commerce System.

U.S. Appl. No. 10/877,806, filed Jun. 24, 2004, Product Recommendation in a Network-Based Commerce System.

U.S. Appl. No. 12/870,031 U.S. Pat. No. 8,712,868, filed Aug. 27, 2010, Listing Recommendation Using Generation of a User-Specific Query in a Network-Based Commerce System (as amended).

U.S. Appl. No. 09/769,546 U.S. Pat. No. 8,533,094, filed Jan. 24, 2001, On-Line Auction Sales Leads.

U.S. Appl. No. 14/022,003, filed Sep. 9, 2013, On-Line Auction Sales Leads.

\* cited by examiner

900

910

| Item # | End Date | Price | Item Title |
|---|---|---|---|
| 1600041041 | 2001-06-16 09:38:41 | DM 31.00 | Football |
| 1600041027 | 2001-06-16 09:38:35 | DM 501.00 | Baseball |
| 1200244601 | 2001-06-16 09:38:34 | DM101.00 | Tennis ball |
| 1600041026 | 2001-06-16 09:38:34 | DM 1,050.00 | Signed baseball |
| 1200244660 | 2001-06-16 09:38:33 | DM 30.00 | Soccer ball |

911 / 912 / 913 / 914

930

| Item # | Item Title | Price | Bids | End Date |
|---|---|---|---|---|
| 1100108432 | Signed baseball | $120.00 | 1 | Jun-13 17:13 |
| 1100108435 | Signed baseball | $510.00 | 1 | Jun-10 17:13 |
| 1100108436 | Signed soccer ball | $510.00 | 1 | Jun-10 17:13 |
| 1400386061 | Signed football | $510.00 | 1 | Jun-10 17:13 |

931 / 932 / 933 / 934 / 935

950

| Item Title | Price | In Stock |
|---|---|---|
| Tennis ball | $3.37 | 14 available now |

End of Item Notices for Unsuccessful Bidders | 1100

| | |
|---|---|
| ⦿ Yes (Include my items) — 1010<br>○ No (do not include my items) — 1015 | Yes Means<br>-Your unsuccessssful bidders will be told they lost.<br>-These bidders will be pointed to your other auctions.<br>-These bidders will see similarly titled items from others<br>-Your items will be showcased in emails to other unsuccessful bidders.<br>No Means<br>-Your unsuccessful bidders will not be shown links to your other auctions.<br>-Your items will not appear in the similar items list sent to other unsuccessful bidders. |

*FIG. 10*

End of Item Notice

Notify me when an item ends if I did not win the item.

Note: An email will always be sent to the winning bidder and seller.

○ Yes — 1110
○ No — 1115

GENERATING A RECOMMENDATION

RELATED APPLICATIONS

This application is a continuation of U.S. patent application Ser. No. 13/565,661, filed Aug. 2, 2012, which application claims the benefit of U.S. patent application Ser. No. 10/263,224, filed Oct. 1, 2002, which application claims the benefit of U.S. Provisional Application No. 60/373,525, filed Apr. 17, 2002, each of which are are incorporated by reference herein in their entirety.

FIELD OF THE INVENTION

The present invention relates generally to the field of Internet-based commerce and, more specifically, to a method of recommending similar commerce goods.

BACKGROUND OF THE INVENTION

Electronic commerce (a.k.a., e-commerce) technology holds the promise of introducing efficiencies into marketplace and trading activities by automating many trading activities, providing near real-time information to both buyers and sellers and providing convenient channels between buyers and sellers.

One example of the e-commerce technology is network-based auction facilities allowing buyers to bid on products and services offered by sellers. In an auction environment only a person who places the highest bid on a particular product or service will be able to purchase that product or service. The unsuccessful bidders who are still interested in obtaining a similar product or service through the same transaction facility are required to search the remaining available items offered for sale through the facility. The transaction facility may contain a large number of items to be searched by the unsuccessful bidders. In addition, in some situations in order to obtain a list of similar items, an unsuccessful bidder has to conduct a sophisticated search requiring an accurate choice of keywords.

SUMMARY OF THE INVENTION

A method and an apparatus for communicating a recommended item to a user of a network-based transaction facility are described. The method comprises determining that the user has been unsuccessful in concluding a transaction pertaining to an item offered for sale via the network-based transaction facility, and, in response to this determination, communicating information concerning a recommended item to the user over a network. The recommended item is available for purchase via the network-based transaction facility.

BRIEF DESCRIPTION OF THE DRAWINGS

The present invention is illustrated by way of example and not limitation in the figures of the accompanying drawings, in which like references indicate similar elements and in which:

FIG. 9 illustrates a graphical interface according to one embodiment of the present invention;

FIG. 10 illustrates a graphical interface to allow a buyer to specify user preferences according to one embodiment of the present invention;

FIG. 11 illustrates a graphical interface to allow a seller to specify user preferences according to one embodiment of the present invention.

DETAILED DESCRIPTION

Figure 1:
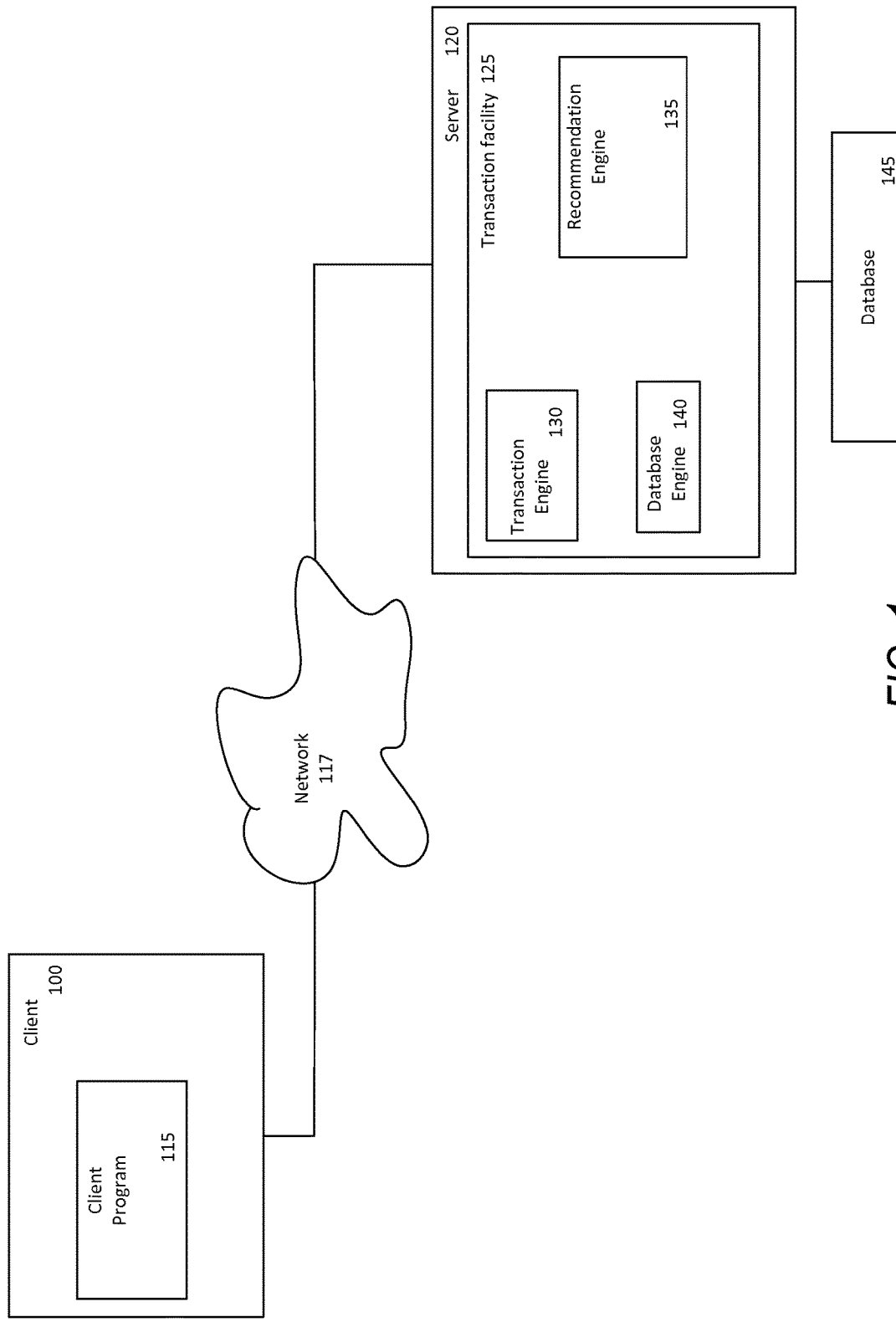
FIG. 1 illustrates an exemplary network architecture in which an embodiment of the present invention may be implemented.

In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Internet-Related Technology

As indicated above, one embodiment of the present invention provides an Internet-based implementation. Accordingly, some introduction to Internet-related technology is helpful in understanding the present invention. The Internet is a vast and expanding network of computers and other devices linked together by various telecommunications media, enabling the various components to exchange and share data. Sites (so-called Web sites), accessible through Internet, provide information about numerous corporations and products, as well as education, research, entertainment and services.

A resource that is attached to the Internet is often referred to as a "host." Examples of such resources include conventional computer systems that are made up of one or more processors, associated memory and other storage devices and peripherals, such as modems, networks interfaces and the like that allow for connection to the Internet or other networks. In most cases, the hosting resource may be embodied as hardware and/or software components of a server or other computer system that includes an interface module, which allows for some dialog with users and that may process information through the submission of Web forms completed by the user. Generally, such a server will be accessed through the Internet's graphical user interface, the World Wide Web, (e.g., via Web browsers) in the conventional fashion.

In order to facilitate communications between hosts, each host has a numerical Internet Protocol (IP) address. The IP address of a hypothetical host computer might be 112.222.64.27. Each host also has a unique "fully qualified domain name." In the case of the hypothetical host 112.222.64.27, the "fully qualified domain name" might be "computer.domain.com", the three elements of which are the hostname ("computer"), a domain name ("domain") and a top level domain ("com"). A given host looks up the IP address of other hosts on the Internet through a system known as domain name service.

As previously indicated, in order to access the Internet most users rely on computer programs known as "Web browsers." Commercially available Web browsers include such well-known programs as Netscape's Navigator™ and Communicator™ and Microsoft's Internet Explorer™. If an Internet user desires to establish a connection with a Web page hosted at computer.domain.com, the Internet user might enter into a Web browser program the uniform resource locator (URL) "http://www.domain.com". The first element of the URL is a transfer protocol, most commonly "http" standing for hypertext transfer protocol, but others include "mailto" for electronic mail, "ftp" for file transfer protocol, and "nntp" for network news transfer protocol. The remaining elements of this URL are an alias for the fully qualified domain name of the host.

Once a URL is entered into the browser, the corresponding IP address is looked up in a process facilitated by a server computer, called the top-level server. The top-level server matches the domain name to an IP address of a domain name server capable of directing the inquiry to the computer hosting the Web page. Thus, the domain name server ultimately matches an alphanumeric name such as www.domain.com with its numeric IP address 112.222.64.27.

When a host receives an inquiry from the Internet, it returns the data in the file pointed to by the request to the computer making the inquiry. Such data may make up a Web page, which may include a textual message, sound, picture, or a combination of such elements. A user can move between Web pages through the use of hyperlinks, which are links from one site on the Internet to another.

A component of one embodiment of the present invention is a computer server. Servers are computer programs that provide some service to other programs, called clients. A client and server communicate by means of message passing often over a network, and use some protocol, a set of formal rules describing how to transmit data, to encode the client's requests and/or responses and the server's responses and/or requests. The server may run continually waiting for client's requests and/or responses to arrive or it may be invoked by some higher level continually running server, which controls a number of specific servers. Client-server communication is analogous to a customer (client) sending an order (request) on an order form to a supplier (server) dispatching the goods and an invoice (response). The order form and invoice are part of the protocol used to communicate in this case.

Exemplary Architecture

With these concepts in mind, an exemplary embodiment of a system architecture of the present invention can be explored. FIG. 1 is a block diagram illustrating an exemplary network-based transaction facility in the form of an Internet-based transaction facility 125. While an exemplary embodiment of the present invention is described within the context of an auction facility, it will be appreciated by those skilled in the art that the invention will find application in many different types of computer-based, and network-based, transaction facilities.

The term "item" is used below to designate any offering by a seller to a buyer, and this term should be understood to include, but not be limited to, any product or service offering. The term "user" is used below to designate any user, buyer or seller, of the transaction facility. The term "original item" is designated to an item on which a buyer unsuccessfully bid.

Referring to FIG. 1, the transaction facility 125 is located on a server machine 120 and includes a number of engines, namely an auction engine 130 to allow buyers to bid on items presented by the sellers, a recommendation engine 135 to compile a list of items similar to the one on which a buyer lost his/her bid and a database engine 140 to maintain database 145.

The Internet-based transaction facility 125 may be accessed by a client program 115, such as a browser (e.g., the Internet Explorer distributed by Microsoft Corp. of Redmond, Wash.) that executes on a client machine 100 (e.g., a personal computer, PDA, cell phone or the like) and accesses the facility 125 via a network 117 such as, for example, the Internet. Other examples of networks that a client may utilize to access the transaction facility 125 include a wide area network (WAN), a local area network (LAN), a wireless network (e.g., cellular network), the Plain Old Telephone Service (POTS) network, etc.

Figure 2:
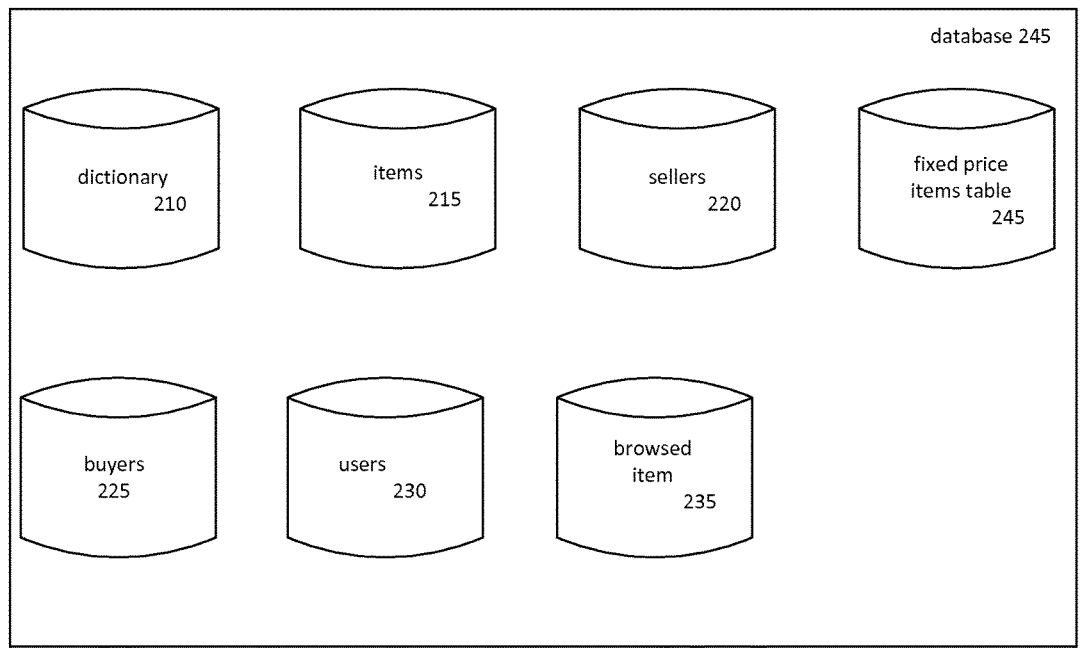
FIG. 2 illustrates database components according to one embodiment of the present invention.

FIG. 2 is a database diagram illustrating an exemplary database 145 of FIG. 1, maintained by and accessed via the database engine 140, which at least partially implements and supports the transaction facility 125. The database 145 comprises a number of tables, namely a dictionary table 210, an items table 215, a sellers table 220, a buyers table 225, a users table 230, a browsed item table 235 and a fixed price items table 250. In one embodiment, the database set 245 of FIG. 2 is implemented as a relational database, and includes a number of tables having entries, or records, that are linked by indices and keys. In an alternative embodiment, the database 245 may be implemented as collection of objects in an object-oriented database.

Central to the database 245 is the users table 230, which contains a record for each user of the transaction facility 125. A user may operate as a seller, buyer, or both, within the transaction facility 125. The database 245 also includes the items table 215 that may be linked to the users table 230. A user record in the users table 230 may be linked to multiple items that are being, or have been, auctioned via the facility 125.

The database 245 also includes the sellers table 220, which contains a record for each seller providing items via the transaction facility 125. The database also includes the buyers table 225, which contains a record for each buyer attempting to acquire items via bidding.

The database 245 is also shown to include a dictionary table 210 that stores terms and/or keywords that may be found in a description of an item offered for sale via the transaction facility 125.

In addition, the database 245 is also shown to include a browsed item table 235 that stores item viewing history for each user of the transaction facility 125. The database 245 comprises a fixed price items table 245 including items that are offered for sale at a fixed, non-negotiable, price.

It will be appreciated by one skilled in the art that the tables may have additional fields and are not limited to the above-described fields.

Figure 3A:
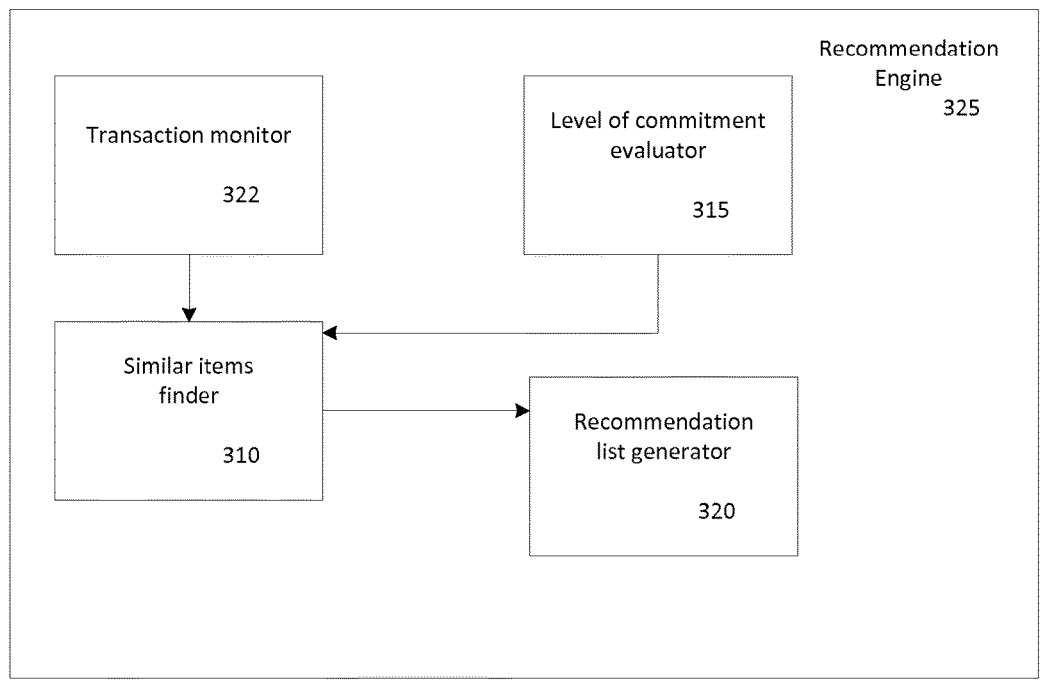
FIG. 3A illustrates components of a recommendation engine according to one embodiment of the present invention.

FIG. 3A illustrates an exemplary embodiment of the recommendation engine 325. The recommendation engine 325 includes a transaction monitor 322, a similar items finder 310, a level of commitment evaluator 315, and a recommendation list generator 320.

The transaction monitor 322 is responsible for monitoring transactions between users of the transaction facility 125 and identifying users who were unsuccessful in concluding transactions. The similar items finder 310 is responsible for locating items offered by sellers of the transaction facility 125 that are similar to an item on which a buyer was unable to conclude the transaction. The level of commitment evaluator 315 is responsible for determining a level of interest of a user in a particular item offered for sale via the transaction facility 125. In one embodiment, the level of interest of the user in the particular item is utilized to determine whether to present the user with a recommendation list containing items similar to the particular item.

The recommendation list generator 320 is responsible for generating a list of similar items located by the similar items finder 310.

While the recommendation engine 325 is described herein as utilizing certain techniques and methodologies to identify recommended items to be recommended to a user, it will be appreciated that any one of a wide variety of recommendation techniques and methodologies may be applied to identify recommended items.

Figure 3B:
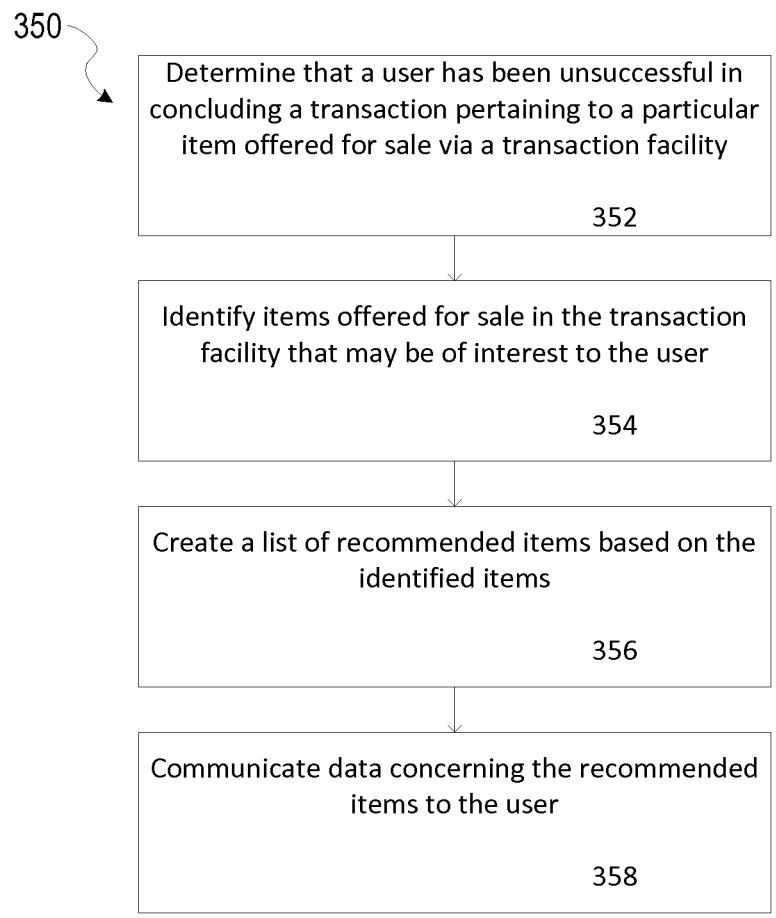
FIG. 3B is a flow diagram of a method for communicating a recommended item to a user of a network-based transaction facility according to one embodiment of the present invention.

FIG. 3B is a flow diagram of one embodiment of a method 350 for communicating recommended items to a user of a network-based transaction facility such the transaction facility 125. Initially, at processing block 352, the transaction monitor 322 determines that a user has been unsuccessful in concluding a transaction pertaining to a particular item offered for sale via the transaction facility 125. In one embodiment, this determination is made if the user was unsuccessful in biding to purchase the particular item. In another embodiment, this determination is made if the user was unable to satisfy some conditions associated with the transaction pertaining to the particular item (e.g., the user's transaction history within the transaction facility 125 may be shorter than required for purchasing the particular item).

Next, at processing block 354, the similar items finder 310 identifies other items offered for sale in the transaction facility 125 that may be of interest to the user. These other items are items that have some similarity to the particular item. In one embodiment, each of these similar items may be identified based on keywords included in its description as will be described in more detail below. In another embodiment, in which the transaction facility 125 supports a hierarchical data structure of categories, the similar items finder 310 identifies the items that may be of interest to the user based on a category to which the particular item is categorized by the transaction facility 125. This category may correspond to any category level within the hierarchical data structure of categories (e.g., the "cars" category, the "BMW cars" category, the "BMW 740 models" category, etc.).

Further, at processing block 356, the recommendation list generator 320 creates a list of recommended items based on the items identified by the similar items finder 310.

Afterwards, at processing block 358, the transaction facility 125 communicates data concerning the recommended items to the user. This data may include, for example, the list of recommended item or a link to the list of recommended item.

Methodology: Lost Bid Notification

Figure 4:
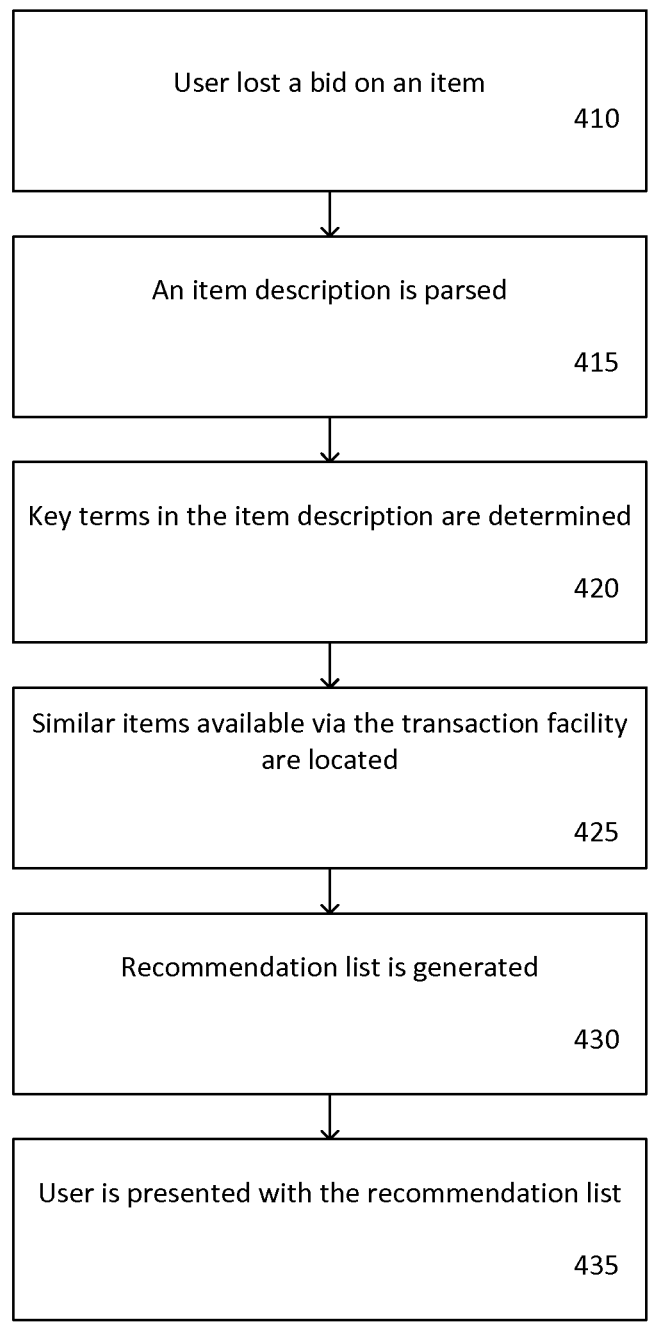
FIG. 4 is a flow diagram of a similar items list generation process according to one embodiment of the present invention.
Figure 5:
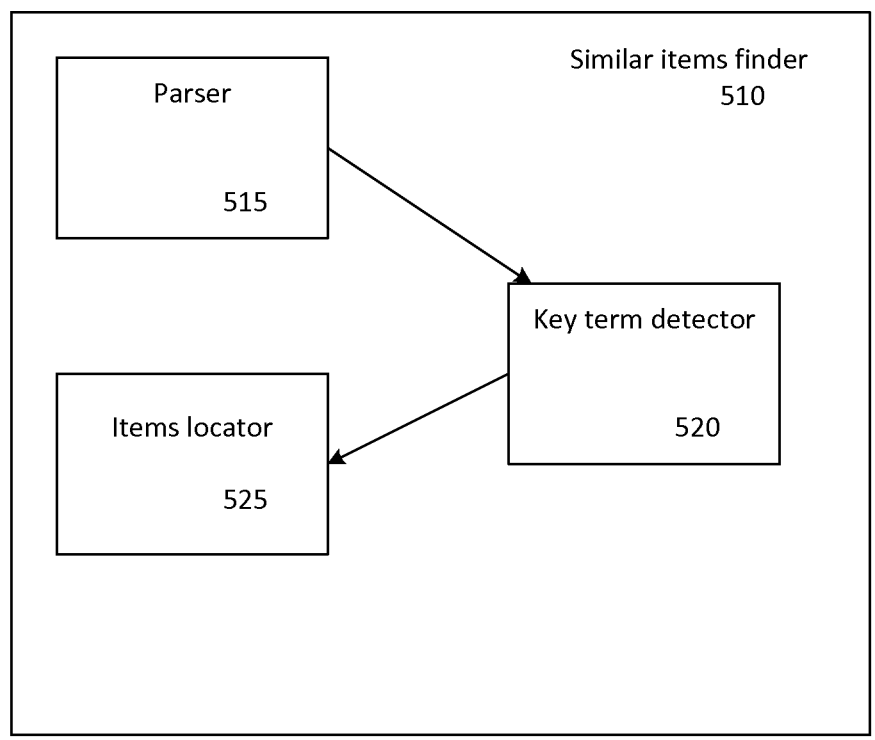
FIG. 5 illustrates components of a similar items finder according to one embodiment of the present invention.

With these concepts in mind an embodiment of the present invention can be further explored with reference to FIGS. 4 and 5. Upon one of the users placing a highest, and winning, bid on a particular item prior to the end of an auction session, the other users, i.e. unsuccessful bidders, who had bid on the same item, but whose bids were not high enough to purchase the item, are notified that their bid was not high enough. Along with the notification of a lost auction session, each unsuccessful user is provided with a list of similar items currently available via the transaction facility 125 that may be of interest to the user.

In order to generate a list of similar items, a parser 515 of similar items finder 510, illustrated in FIG. 5, retrieves a description of the item, on which the user unsuccessfully bid, from the items table 215. Upon retrieval of the item description, the parser 515 at 415 of FIG. 4 parses the description to identify keywords. In one embodiment, every word of the item description is searched in the dictionary table 210 to determine if the parsed word is a key word. For example, an item description "Barbie™ doll" is parsed by the parser 515 into two words "Barbie" and "doll". At 420, upon parsing the description, a key term detector 520 searches the dictionary table 210 for terms "Barbie" and "doll" to determine if either of the words included in the item description are keywords that may be utilized to search for similar items available via the transaction facility 125. It will be appreciated by one skilled in the art that searching the dictionary table 210 for keywords is not limited to any particular searching technique and a variety of searching techniques may be utilized.

Upon determining which keywords are present in the item description, the items locator 525 searches the items table 215 of FIG. 2 for currently offered items which description indicates that the item may be similar to the one that the user could not purchase due to a low placed bid. In one embodiment, the items locator 525 searches for items which description contains keywords retrieved from the description of the original item. For example, if the description of the item that the user could not purchase is "Barbie™ doll", and the word "Barbie" and the word "doll" were determined to be keywords by the key term detector 520, then the items locator 525 may search the items table 215 for items which description contains the word "Barbie" or word "doll", or both.

In one embodiment, the dictionary table 210 comprises words that were assigned a weight greater than a pre-determined threshold. The weight of a word depends on how frequently this word had been used in item descriptions within the transaction facility 125. Words that are infrequently included in item descriptions are assigned higher weights than the ones that are frequently can be found in an item description. For example, in an item description "Book by Asimov in good condition", the word "Asimov" will be assigned a greater weight than the word "book." It will be appreciated by one skilled in the art that the pre-determined threshold is not limited to any value and may be set based on a particular implementation of the transaction facility 125.

In another embodiment, the parser 515 parses the item description to identify the words that contain a number of letters greater than a pre-determined number of letters threshold. For example, the number of letters threshold may be set to 7 indicating that every word that contains more than 7 letters is a keyword to be utilized in the recommendation list generation. If a particular item description does not include words comprising a number of letters greater that the number of letters threshold, the parser 515 determines the longest words out of all the words contained in the item description in order for the items locator 525 to utilize these words as keywords in locating similar items in the items table 215. In one embodiment there may be a word limit threshold indicating how many words to use as keywords when none of the words are longer than the threshold. For example, the word limit threshold may be set to 1 indicating that if the item description does not include words longer than the threshold, then only the longest word from the item description may be used as a keyword by the items locator 525.

It will be appreciated that other mechanisms for finding similar items may be employed. For example, a collaborative filtering method may be utilized, wherein similar items are identified by determining other users that were interested in the item on which the user unsuccessfully bid, and identifying other items in which those users showed interest.

In one embodiment the recommendation list generator 320 of FIG. 3 at 430 generates a list of similar items that were located in the items table 215 by the items locator 525. In one embodiment the recommendation list generator 320 generates two lists, one comprising similar items being sold by the same seller, and the other list comprises similar items that may be of interest to the user that are being sold by sellers other than the seller of the original item.

At 435 the recommendation engine 325 may present the user with the generated recommendation list including items that may be of interest to the user. In one embodiment, the user may be presented with the recommendation list via an email message comprising the generated recommendation list. In another embodiment, the user may be provided with an email message comprising a link to a web page containing the recommendation list. In yet another embodiment, the recommendation list may be presented to the user next time the user utilizes the features of the transaction facility 125, for example, upon the next user's log-in into the transaction facility 125.

In one embodiment, in order to ensure that the seller of the original item has enough time to re-list items that he/she is currently attempting to sell via the transaction facility 125, the unsuccessful bidders are presented with the recommendation list by the recommendation engine 325 upon an expiration of a time interval from the termination of the auction session, for example 24 hours later. It will be appreciated that the time interval is not limited to the above example, and any time interval may be utilized to allow the sellers to re-list their items.

In one embodiment of the present invention, the generated recommendation list may comprise only items that are being sold by the seller of the original item. Alternatively, the generated recommendation list may also comprise similar items that are sold by sellers other than the seller of the original item.

Methodology: Items of Interest Notification

Figure 6:
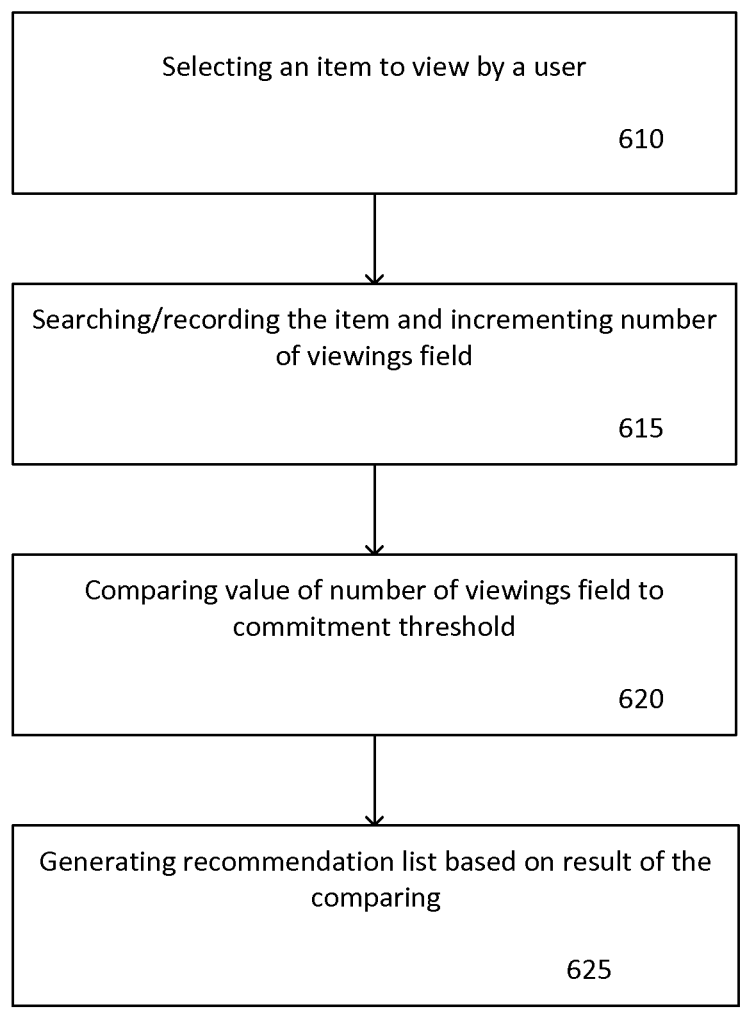
FIG. 6 is a flow diagram of a similar items list generation process for an item browsed by a user according to one embodiment of the present invention.
Figure 7:
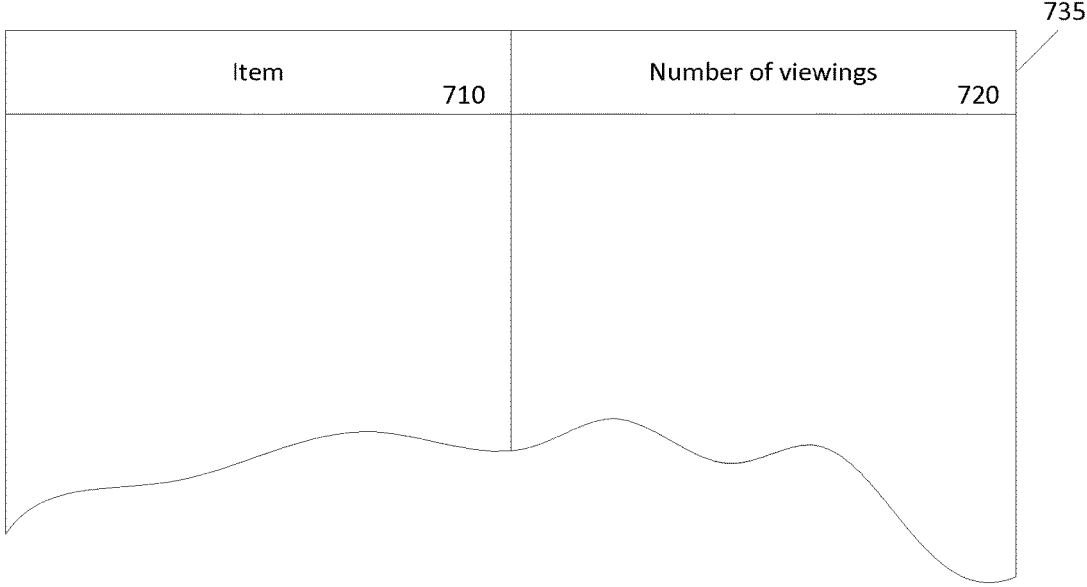
FIG. 7 illustrates a browsed item table according to one embodiment of the present invention.

In one embodiment of the present invention, the user of the transaction facility 125 does not have to bid on an item in order to receive a recommendation list of items that may be of interest to the user. The user may be presented with a recommendation list based on the user's actions, for example, a selection of a particular item within a category, a request to view a particular item without making a bid on this item, etc. This embodiment is described with reference to FIG. 6. At 610 a user selects an item for viewing presented via the client program 115 and available via the transaction facility 125 of FIG. 1. At 615, upon the user selecting the item available on the transaction facility 125, the level of commitment evaluator 315 of FIG. 3 may search an item field 710 of the browsed item table 735 illustrated in FIG. 7 for the selected item. The level of commitment evaluator 315 may also increment a value in a number of viewings field 720 of the browsed item table 735 corresponding to the user-selected item upon completion of a successful search for the user-selected item. If the selected item is not present in the browsed item table 735, the level of commitment evaluator 315 may record the name of the selected item in the item field 710 of the browsed item table 735. In one embodiment the level of commitment evaluator 315 may insert value 1 into the number of viewings field 720 upon insertion of the user-selected item into the browsed category table 735.

At 620 the level of commitment evaluator 315 compares the value of the number of viewings field 715 to a commitment threshold. In one embodiment of the present invention, the commitment threshold represents a level of user interest in a particular item. For example, if the value of the commitment threshold is 3, it indicates that if the same user selects a particular item three times, the particular item is of importance to the user, indicating that the user may be interested in the items similar to the selected item.

At 625 if the value of the number of viewings field is greater than the value of the commitment threshold, the recommendation engine 325 may generate a recommendation list comprising other items that are similar to the user selected item and may be of interest to the user. In one embodiment, the recommendation engine 325 may locate similar items by parsing the description of the item selected by the user and locating other items which descriptions contain identical keywords as the description of the selected item. This technique is described in more detail above with reference to FIG. 4.

It will be appreciated that in a manner similar to the one described above with reference to FIGS. 6 and 7 the level of commitment evaluator 325 may determine the level of user's interest in a particular item category available via the transaction facility 125.

Methodology: User-Interface and User Preferences

FIG. 9 illustrates a user interface display 900 that may be presented to the user who lost a particular auction session according to one embodiment of the present invention. The user interface may comprise a recommendation list of items that may be of interest to the user. The user interface display 900 may be divided into three sections 910, 930 and 950. In one embodiment section 910 is a table comprising information about items that are offered for sale by the seller who listed the auction session that the user lost. Section 910 contains an item # field 911 listing the number of items available via the transaction facility 125 and offered by the same seller. An end of date field 912 lists the time at which the auction of the particular item will terminate. The price of the item may be listed in a price field 913. An item title field 914 may comprise the title of the item.

In one embodiment the section 930 of the user interface display 900 may be a table containing items that are similar to the original item and that are offered by sellers other than the one of the original item. The table may contain an item # field 931 listing the number of items available via the transaction facility 125. An item title field 932 may contain the title of the item. The price of the item may be listed in a price field 933. A bids field 934 may contain the number representing the total number of bids placed by other users on the particular item. The end of the auction session may be listed in an end date field 935.

In one embodiment the section 950 of the user interface display 900 may be a table containing items that are similar to the original item and that are offered via other facilities linked to the transaction facility. For example, in one embodiment the transaction facility 125 may be part of a commerce facility offering items for sale at a fixed, non negotiable, price. In this embodiment, the recommendation engine may generate a list of items that are similar to the original items by searching the fixed price items table (not shown) of database 245 of FIG. 2 for items with descriptions containing keywords retrieved from the original item description. The table of the section 950 may contain an item title field 951 listing the title of a similar item. The price of the item may be listed in a price field 952 and information about availability of the item may be listed in the in stock field 953. In one embodiment the field 953 indicates the total number of items available in stock at the current time. In another embodiment the field 953 may specify the length of time required to obtain an item ready for shipment to the user if the item is not currently in stock.

In one embodiment if the recommendation engine did not locate similar items to be displayed in a particular section of the user interface display 900, that section may be displayed containing a table with empty fields. In another embodiment that section may display a message indicating that none of the similar items were found. Yet, in another embodiment that section may contain no graphical data.

In one embodiment the user may be presented with the user interface display via an email message. The body of the email message contains user interface display 900. The item number field of tables of the Sections 910 and 930 may contain item numbers constituting links to a web page containing detailed information about the items. The item title field of the table displayed in section 950 may contain a link to the web page displaying detailed information about the particular item.

In one embodiment, the user may be presented with the recommendation list via an email message containing a link to a web page comprising the user interface display 900.

In another embodiment, the user may be presented with the recommendation list in the form of the user interface display 900 upon the next log in session to the transaction facility 125.

Figure 8A:
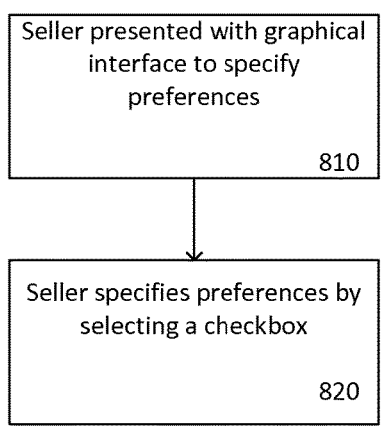
FIG. 8A is a flow diagram of a specification of seller preferences process according to one embodiment of the present invention.

In one embodiment, the users of the transaction facility 125 of FIG. 1 may specify whether they would like to utilize the generation of the recommendation lists feature of the transaction facility 125. In one embodiment, at 810 of FIG. 8A the transaction facility 125 may present the sellers offering goods or services via the transaction facility 125 with a graphical interface 1000 illustrated in FIG. 10. The graphical interface 1000 comprises two check boxes, a "Yes" check box 1010 and a "No" check box 1015. The graphical interface 1000 comprises an explanation of checkboxes 1010 and 1015 in order to allow the seller to make an informed decision prior to selecting a checkbox. At 820 the seller selects a check box, Selection of the checkbox 1010 indicates that the seller prefers the unsuccessful bidders to be notified that they lost a particular auction session and be informed of other auctions of similarly titled items offered either by the seller or by other users of the transaction facility 125. In addition, other items that the seller offers via the transaction facility 125 may be included into the recommendation lists for users who did not bid on the seller's services or goods. Selection of the checkbox 1015 indicates that the seller prefers the unsuccessful bidders to not be presented with the links to the seller's other auctions. Moreover, the selection of the checkbox 1015 indicates that the seller prefers not to have his/her items be included in any recommendation lists generated by the recommendation engine 325.

In one embodiment of the present invention, the seller may specify his/her preferences upon creating an account with the transaction facility 125. In another embodiment, the seller may be presented with an option to specify his/her preferences every time the seller decides to offer an item for sale via the transaction facility 125.

Figure 8B:
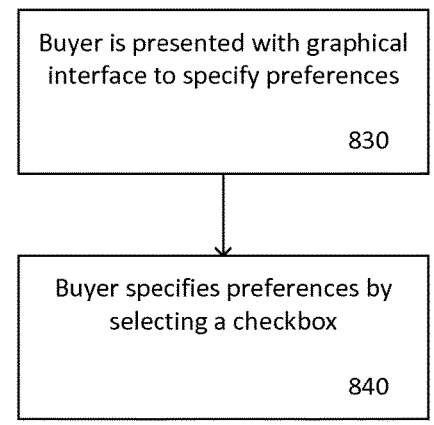
FIG. 8B is a flow diagram of a specification of buyer preferences process according to one embodiment of the present invention.

At 830 of FIG. 8B a buyer may also be presented with a graphical interface 1100 illustrated in FIG. 11 according to one embodiment of the present invention. The graphical interface 1100 contains two checkboxes, checkbox 1110 and checkbox 1115. At 840 the buyer selects a checkbox by clicking on it. Selection of the checkbox 1110 indicates that the buyer prefers to receive a notification of a termination of an auction session that the buyer did not win. In addition, the selection of the checkbox 1110 indicates that the buyer prefers to receive a recommendation list comprising items with similar titles than the one the buyer could not purchase. Selection of the checkbox 1115 indicates that the buyer prefers not to receive notification of a termination of an auction session that the buyer did not win along with recommendation lists of items with similar titles.

In one embodiment the buyer may specify his/her preferences utilizing the graphical interface 1100 when creating an account with the transaction facility 125. In another embodiment the buyer may be presented with the graphical interface 1100 upon placing a bid on a particular item offered via the transaction facility 125. Yet, in another embodiment the buyer may be presented with the link to the graphical user interface in an email message indicating that the buyer is the current high bidder on a particular item.

Computer System

Figure 12:
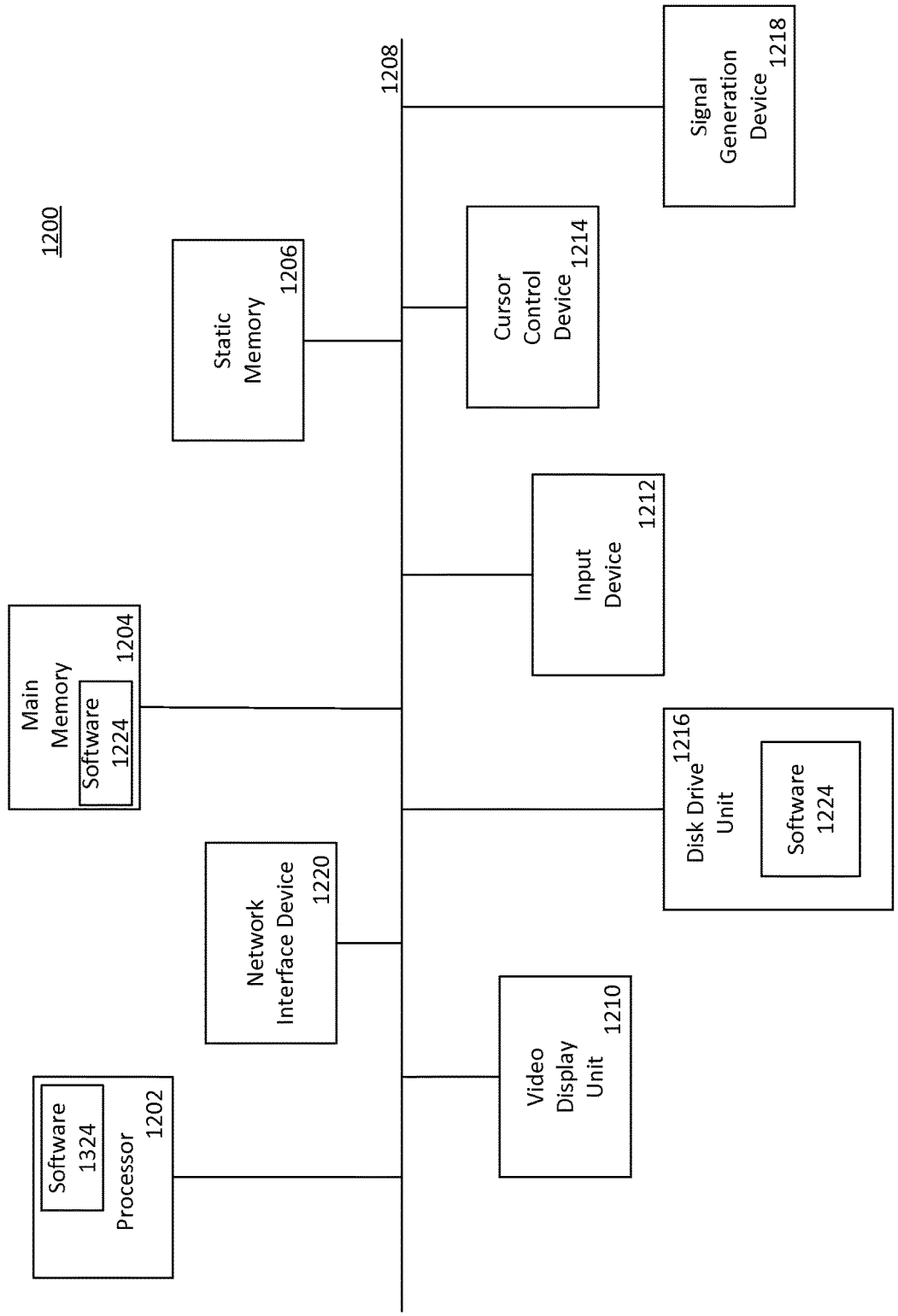
FIG. 12 illustrates a computer system according to one embodiment of the present invention.

FIG. 12 shows a diagrammatic representation of machine in the exemplary form of a computer system 1200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored a set of instructions (i.e., software) 1224 embodying any one, or all, of the methodologies described above. The software 1224 is also shown to reside, completely or at least partially, within the main memory 1204 and/or within the processor 1202. The software 1224 may further be transmitted or received via the network interface device 1220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system comprising:
    a memory having instructions embodied thereon; and
    one or more processors configured to execute the instructions and perform operations comprising:
        incrementing a commitment evaluation value associated with a first item described on an item page based on a determination that the item page was requested by a remote client device;
        generating a recommendation of a second item for communication to the remote client device based on another determination that the incremented commitment evaluation value exceeds a defined commitment value threshold associated with the first item, the recommendation being generated by:
            parsing a set of words from a first description of the first item based at least in part on a comparison of determined word lengths in the first description to a defined word length threshold, and
            selecting the second item to include in the recommendation based on a determination that a second description of the second item also includes the parsed set of words.

2. The system of claim 1, wherein the set of words is parsed based further in part on a defined word count threshold.

3. The system of claim 1, wherein the set of words is parsed from the first description based further in part on a determination that the defined word length threshold exceeds each word length in the determined word lengths.

4. The system of claim 3, wherein the set of words is parsed from the first description based further in part on a determined maximum word length of the determined word lengths.

5. The system of claim 1, wherein
    the generated recommendation is communicated to the remote client device based on stored seller preference data associated with the first item.

6. The system of claim 1, wherein the commitment evaluation value corresponds to a number of times the item page has been requested by the remote client device.

7. The system of claim 1, wherein the generated recommendation is communicated to the remote client device in response to a subsequent log-in from the remote client device.

8. A computer-implemented method comprising:
    incrementing a commitment evaluation value associated with a first item described on an item page based on a determination that the item page was requested by a remote client device;
    parsing a set of words from the first item description based at least in part on a determination that the incremented commitment evaluation value exceeds a defined commitment value threshold associated with the first item and that a defined word length threshold exceeds a determined length of each word in a plurality of words included in the first item description;
    searching for the parsed set of words in at least a second description corresponding to a second item;
    selecting the second item as a recommended item based on a determination that the second item includes the parsed set of words; and
    generating a recommendation that includes the recommended item for communication to the remote client device based on the selection.

9. The computer-implemented method of claim 8, wherein the set of words is parsed from the first item description based further in part on a determined longest word length for the plurality of words included in the first item description.

10. The computer-implemented method of claim 9, wherein each word in the parsed set of words has a number of characters that corresponds to the determined longest word length.

11. The computer-implemented method of claim 8, wherein the set of words is parsed from the first item description based further in part on a defined word count threshold.

12. The computer-implemented method of claim 8, wherein
    the generated recommendation is communicated to the remote client device based on a determination that seller preference data associated with the first item includes an authorization to communicate the recommendation.

13. The computer-implemented method of claim 8, wherein the commitment evaluation value corresponds to a number of times the item page has been requested by the remote client device.

14. The computer-implemented method of claim 8, wherein the generated recommendation is communicated to the remote client device in response to a link corresponding to the generated recommendation being activated by the remote client device.

15. A non-transitory machine-readable medium having instructions embodied thereon, which, when executed by one or more processors, cause the one or more processors to perform operations comprising:
    incrementing a commitment evaluation value associated with a first item described on an item page based on a determination that the item page was requested by a remote client device;
    parsing a set of words from the first item description based at least in part on a determination that the incremented commitment evaluation value exceeds a defined commitment value threshold associated with the first item, and that each word in the parsed set of words has a corresponding word length that is at least as long as a determined longest word length for a plurality of words included in the first item description;
    selecting a second item as a recommended item based on a determination that a second description corresponding to the second item includes the parsed set of words; and
    generating a recommendation that includes the recommended item for communication to the remote client device based on the selection.

16. The non-transitory machine-readable medium of claim 15, wherein the set of words is parsed from the first item description based further in part on a comparison of the determined longest word length to a defined word length threshold.

17. The non-transitory machine-readable medium of claim 16, wherein each word in the parsed set of words has a corresponding word length that is equal to the determined longest word length based on the comparison indicating that the defined word length threshold is greater than the determined longest word length.

18. The non-transitory machine-readable medium of claim 15, wherein the commitment evaluation value corresponds to a number of times that the item page has been requested by the remote client device.

19. The non-transitory machine-readable medium of claim 15, wherein the set of words is parsed based further in part on the determination that the item page was requested by the remote client device.

20. The non-transitory machine-readable medium of claim 15, wherein the generated recommendation is communicated to the remote client device via an email message associated with the remote client device.

* * * * *